US012712935B2

(12) United States Patent
Hu

(10) Patent No.: US 12,712,935 B2
(45) Date of Patent: Aug. 18, 2026

(54) POINT CLOUD ENCAPSULATION AND DECAPSULATION

(71) Applicant: Tencent Technology (Shenzhen) Company Limited, Shenzhen (CN)

(72) Inventor: Ying Hu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 94 days.

(21) Appl. No.: 18/951,556

(22) Filed: Nov. 18, 2024

(65) Prior Publication Data

US 2025/0080597 A1 Mar. 6, 2025

Related U.S. Application Data

(63) Continuation of application No. PCT/CN2023/133893, filed on Nov. 24, 2023.

(30) Foreign Application Priority Data

Nov. 29, 2022 (CN) ......................... 202211517326.2

(51) Int. Cl.
*H04L 65/70* (2022.01)

(52) U.S. Cl.
CPC .................................. *H04L 65/70* (2022.05)

(58) Field of Classification Search
CPC ...... H04N 19/85; H04N 10/154; H04N 19/42; H04N 19/463; H04N 19/596; H04L 65/70; H04L 65/60
See application file for complete search history.

(56) References Cited

U.S. PATENT DOCUMENTS

| | | | | |
|---|---|---|---|---|
| 12,056,091 | B2 * | 8/2024 | Xu | H04L 65/61 |
| 12,299,942 | B2 * | 5/2025 | Oh | H04N 21/816 |
| 12,316,844 | B2 * | 5/2025 | Pang | H04N 19/124 |
| 2021/0112278 | A1 * | 4/2021 | Wang | H04L 65/765 |

FOREIGN PATENT DOCUMENTS

| | | | |
|---|---|---|---|
| CN | 111435991 | A | 7/2020 |
| CN | 115348243 | A | 11/2022 |

OTHER PUBLICATIONS

International Search Report and Written Opinion received for PCT Patent Application No. PCT/CN2023/133893, mailed on Feb. 20, 2024, 12 pages (5 pages of English Translation and 7 pages of Original Document).

* cited by examiner

*Primary Examiner* — Dac V Ha
(74) *Attorney, Agent, or Firm* — ARENTFOX SCHIFF LLP

(57) ABSTRACT

A method of point cloud decapsulation includes obtaining a first information data box of a first content entity that carries point cloud data of a point cloud in a point cloud file. The first information data box includes a first entity identifying field configured to indicate an alternative attribute of the first content entity associated with at least two point cloud bitstreams of the point cloud. A first value of the first entity identifying field indicates that the first content entity belongs to a single point cloud bitstream of the at least two point cloud bitstreams, a second value of the first entity identifying field indicates that the first content entity is a common portion shared by the at least two point cloud bitstreams. The method also includes decapsulating the point cloud file based on the first information data box.

20 Claims, 10 Drawing Sheets

FIG. 6

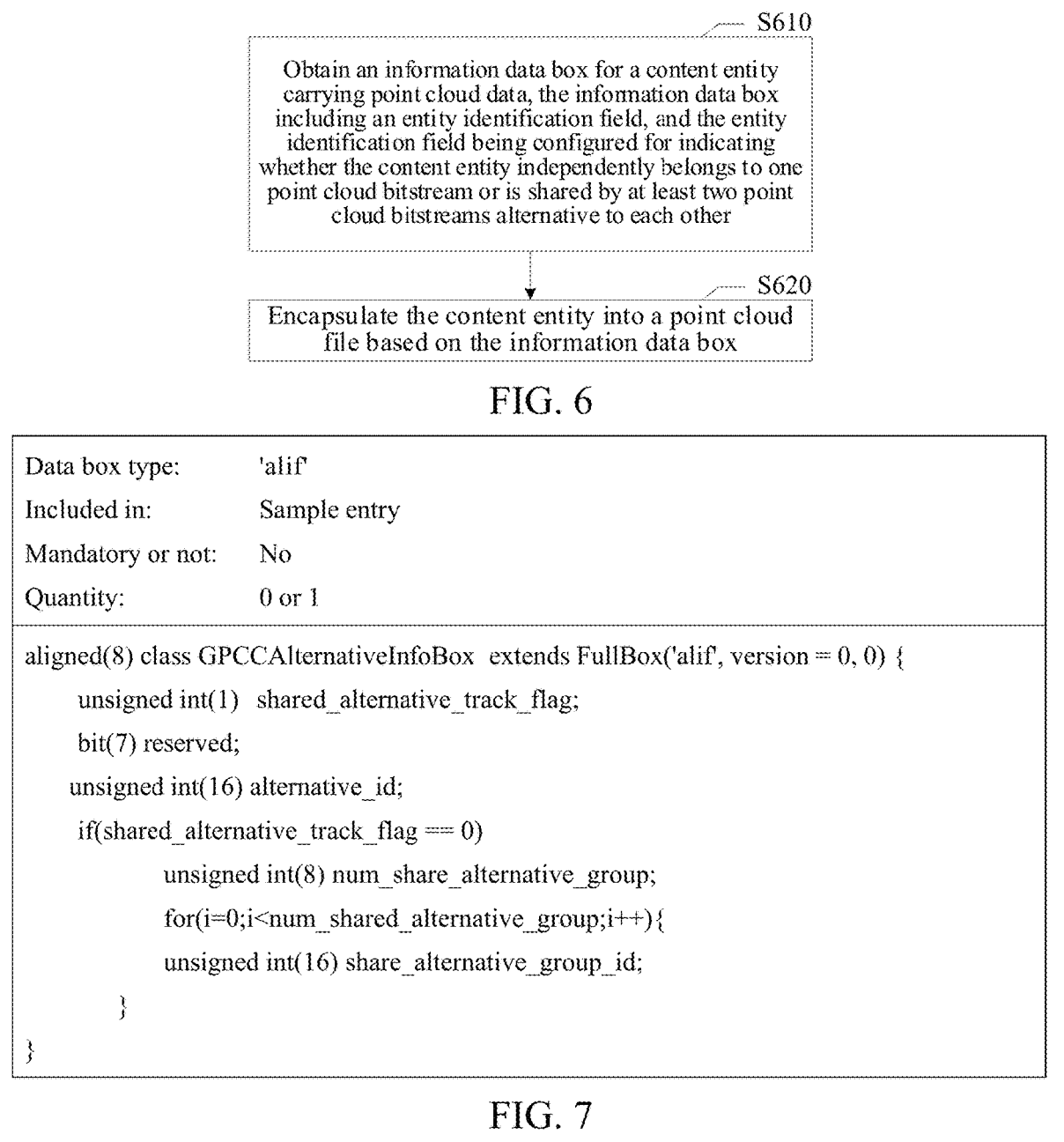

| | |
|---|---|
| Data box type: | 'alif' |
| Included in: | Sample entry |
| Mandatory or not: | No |
| Quantity: | 0 or 1 |

```
aligned(8) class GPCCAlternativeInfoBox  extends FullBox('alif', version = 0, 0) {
    unsigned int(1)  shared_alternative_track_flag;
    bit(7) reserved;
   unsigned int(16) alternative_id;
    if(shared_alternative_track_flag == 0)
            unsigned int(8) num_share_alternative_group;
            for(i=0;i<num_shared_alternative_group;i++){
            unsigned int(16) share_alternative_group_id;
        }
}
```

FIG. 7

```
aligned(8) class AvsPCCAlternativeInfoStruct() {
unsigned int(1) quality_ranking_flag;
unsigned int(1) shared_alternative_track_flag;
bit(6) reserved=0;
unsigned int(16) alternative_id;
if(quality_ranking_flag == 1){
unsigned int(8) quality_ranking;
}
if(shared_alternative_track_flag == 1){
unsigned int(8) num_share_alternative_group;
for(i=0;i<num_shared_alternative_group;i++){
unsigned int(16) share_alternative_group_id;
}
}
}
```

FIG. 12

| | |
|---|---|
| Data box type: | 'apag' |
| Included in: | TrackGroupBox |
| Mandatory or not: | No |
| Quantity: | 0, 1, or more |

```
aligned(8) class AvsPCCAlternativeTrackGroupBox extends
TrackGroupTypeBox('apag') {
// track_group_id inherits from TrackGroupTypeBox
AvsPCCAlternativeInfoStruct();
}
```

FIG. 13

| | |
|---|---|
| Data box type: | 'apae' |
| Included in: | GroupsListBox |
| Mandatory or not: | No |
| Quantity: | 0, 1, or more |

```
aligned(8) class AvsPCCAlternativeEntityToGroupBox ('apae', version=0, flags=0) extends
EntityToGroupBox {
unsigned int(32) group_id;
unsigned int(32) num_entities_in_group;
for(i=0; i<num_entities_in_group; i++){
    unsigned int(32) entity_id;
    AvsPCCAlternativeInfoStruct();
}

}
```

POINT CLOUD ENCAPSULATION AND DECAPSULATION

RELATED APPLICATIONS

The present application is a continuation of International Application No. PCT/CN2023/133893 filed on Nov. 24, 2023 and entitled "POINT CLOUD ENCAPSULATION METHOD AND APPARATUS, POINT CLOUD DE-ENCAPSULATION METHOD AND APPARATUS, AND MEDIUM AND ELECTRONIC DEVICE," which claims priority to Chinese Patent Application No. 202211517326.2 filed on Nov. 29, 2022 and entitled "POINT CLOUD ENCAPSULATION METHOD AND APPARATUS, POINT CLOUD DECAPSULATION METHOD AND APPARATUS, MEDIUM, AND ELECTRONIC DEVICE." The entire disclosures of the prior applications are hereby incorporated by reference.

FIELD OF THE TECHNOLOGY

This disclosure relates to the field of point cloud technologies, including point cloud encapsulation and point cloud decapsulation.

BACKGROUND OF THE DISCLOSURE

A point cloud is a set of discrete points that are irregularly distributed in space and express a spatial structure and a surface attribute of a three-dimensional object or scene. Point cloud media may be classified into three degrees of freedom (Degree of Freedom, DoF for short) media, 3DoF+ media, and 6DoF media according to the degree of freedom of a user when consuming media content.

For point cloud media having the same content, alternative point cloud bitstreams with different quality may be formed through encoding for a user to choose to consume. When point cloud bitstreams with different quality are encapsulated in the same point cloud file, it is difficult to recognize an alternative relationship between the point cloud bitstreams.

SUMMARY

This disclosure provides a point cloud encapsulation method, a point cloud decapsulation method, a point cloud encapsulation apparatus, a point cloud decapsulation apparatus, a computer-readable storage medium (also referred to as non-transitory computer-readable storage medium), an electronic device, and a computer program product, to effectively recognize an alternative point cloud bitstream in a point cloud file.

Some aspects of the disclosure provide a method of point cloud decapsulation. The method includes obtaining a first information data box of a first content entity that carries point cloud data of a point cloud in a point cloud file. The first information data box includes a first entity identifying field, and the first entity identifying field is configured to indicate an alternative attribute of the first content entity associated with at least two point cloud bitstreams of the point cloud, the at least two point cloud bitstreams are alternative to each other, a first value of the first entity identifying field indicates that the first content entity belongs to a single point cloud bitstream of the at least two point cloud bitstreams, a second value of the first entity identifying field indicates that the first content entity is a common portion shared by the at least two point cloud bitstreams. The method also includes decapsulating the point cloud file based on the first information data box to obtain at least one point cloud bitstream comprising the first content entity.

Some aspects of the disclosure provide a method of point cloud encapsulation. The method includes obtaining a first information data box of a first content entity that carries point cloud data of a point cloud. The first information data box includes a first entity identifying field, and the first entity identifying field is configured to indicate an alternative attribute of the first content entity associated with at least two point cloud bitstreams of the point cloud, the at least two point cloud bitstreams are alternative to each other, a first value of the first entity identifying field indicates that the first content entity belongs to a single point cloud bitstream in the at least two point cloud bitstreams, a second value of the first entity identifying field indicates that the first content entity is a common portion shared by the at least two point cloud bitstreams. The method also includes encapsulating the first content entity into a point cloud file based on the first information data box.

Some aspects of the disclosure provide an apparatus for point cloud decapsulation. The apparatus includes processing circuitry configured to obtain a first information data box of a first content entity that carries point cloud data of a point cloud in a point cloud file. The first information data box includes a first entity identifying field, and the first entity identifying field is configured to indicate an alternative attribute of the first content entity associated with at least two point cloud bitstreams of the point cloud, the at least two point cloud bitstreams are alternative to each other, a first value of the first entity identifying field indicates that the first content entity belongs to a single point cloud bitstream of the at least two point cloud bitstreams, a second value of the first entity identifying field indicates that the first content entity is a common portion shared by the at least two point cloud bitstreams. The processing circuitry is further configured to decapsulate the point cloud file based on the first information data box to obtain at least one point cloud bitstream comprising the first content entity.

According to an aspect of embodiments of this disclosure, a point cloud encapsulation method is provided. The method includes:

obtaining an information data box for a content entity carrying point cloud data, the information data box including an entity identification field, and the entity identification field being configured for indicating whether the content entity independently belongs to one point cloud bitstream or is shared by at least two point cloud bitstreams alternative to each other; and encapsulating the content entity into a point cloud file based on the information data box.

According to an aspect of embodiments of this disclosure, a point cloud decapsulation method is provided. The method includes:

obtaining an information data box of a content entity carrying point cloud data in a point cloud file, the information data box including an entity identification field, and the entity identification field being configured for indicating whether the content entity independently belongs to one point cloud bitstream or is shared by at least two point cloud bitstreams alternative to each other; and decapsulating the point cloud file based on the information data box to obtain at least one point cloud bitstream including the content entity.

According to an aspect of embodiments of this disclosure, a point cloud encapsulation apparatus is provided. The apparatus includes:

a first obtaining module, configured to obtain an information data box for a content entity carrying point cloud data, the information data box including an entity identification field, and the entity identification field being configured for indicating whether the content entity independently belongs to one point cloud bitstream or is shared by at least two point cloud bitstreams alternative to each other; and an encapsulation module, configured to encapsulate the content entity into a point cloud file based on the information data box.

According to an aspect of embodiments of this disclosure, a point cloud decapsulation apparatus is provided. The apparatus includes:

a second obtaining module, configured to obtain an information data box of a content entity carrying point cloud data in a point cloud file, the information data box including an entity identification field, and the entity identification field being configured for indicating whether the content entity independently belongs to one point cloud bitstream or is shared by at least two point cloud bitstreams alternative to each other; and a decapsulation module, configured to decapsulate the point cloud file based on the information data box to obtain at least one point cloud bitstream including the content entity.

According to an aspect of embodiments of this disclosure, a computer-readable medium is provided, having a computer program stored thereon, the computer program, when executed by a processor, implementing the method in the foregoing technical solutions.

According to an aspect of embodiments of this disclosure, an electronic device is provided. The electronic device includes: a processor (e.g., processing circuitry); and a memory (e.g., non-transitory computer readable storage medium), configured to store an executable instruction of the processor. The processor is configured to execute the executable instruction to perform the method in the foregoing technical solutions.

According to an aspect of embodiments of this disclosure, a computer program product is provided, including a computer program, the computer program, when executed by a processor, implementing the method in the foregoing technical solutions.

BRIEF DESCRIPTION OF THE DRAWINGS

FIG. 6 shows a point cloud encapsulation method based on an indicated alternative relationship between point cloud bitstreams in an embodiment of this disclosure.

FIG. 7 shows a data structure of a newly added alternative information data box in an embodiment of this disclosure.

FIG. 12 shows a point cloud alternative information structure based on the AVS standard in an embodiment of this disclosure.

FIG. 13 shows a data box structure of a point cloud alternative track group based on the AVS standard in an embodiment of this disclosure.

FIG. 14 shows a data box structure of a non-time sequence point cloud media alternative group based on the AVS standard in an embodiment of this disclosure.

DESCRIPTION OF EMBODIMENTS

Figure 1:
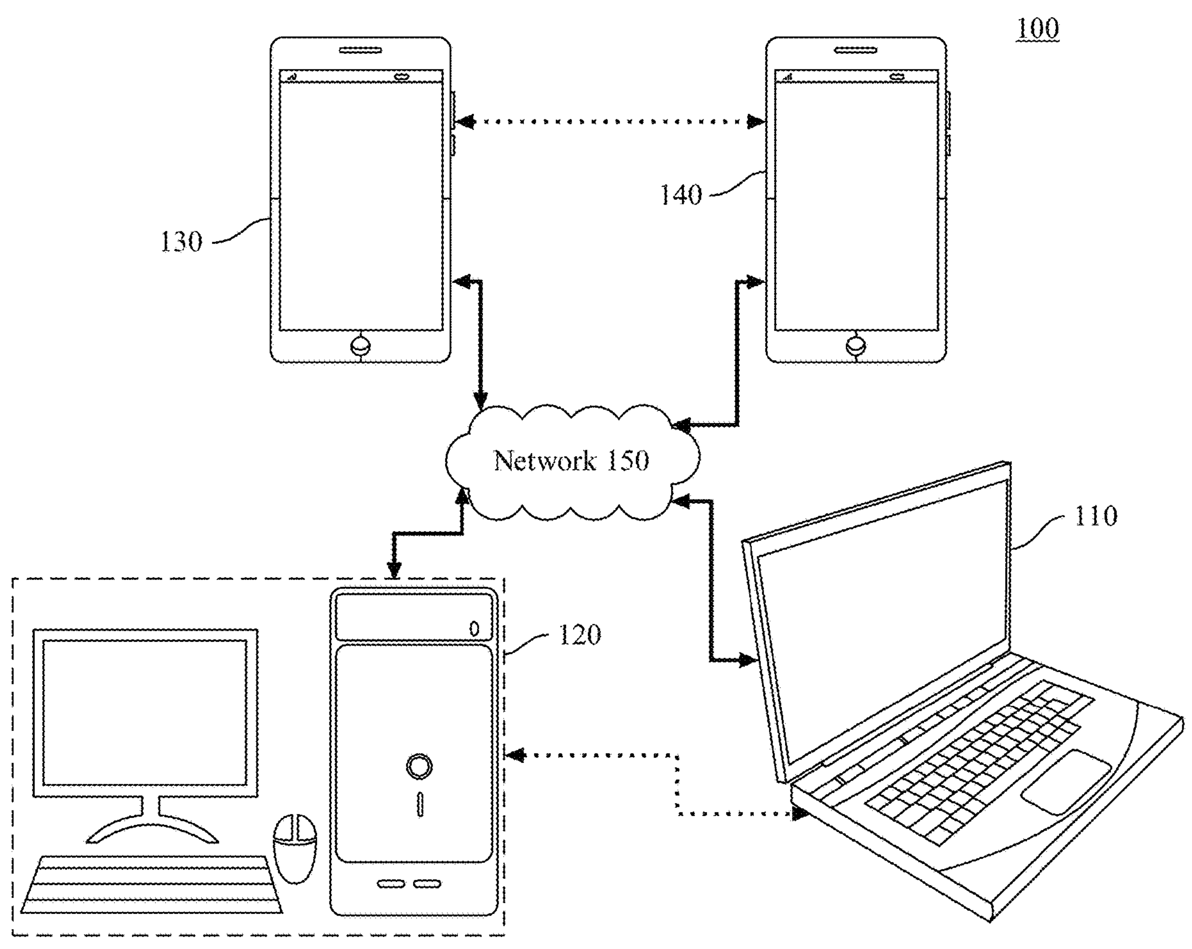
FIG. 1 is a schematic diagram of a system architecture in an example to which a technical solution of an embodiment of this disclosure may be applied.

Example implementations are described with reference to the accompanying drawings. However, the example implementations may be implemented in a plurality of forms, and are not to be construed as being limited to examples described herein.

In addition, the described features, structures, or characteristics may be combined in one or more embodiments in any appropriate manner. In the following descriptions, a lot of specific details are provided to give a comprehensive understanding of embodiments of this disclosure. However, the technical solutions in this disclosure may be implemented without one or more of the particular details, or another method, unit, apparatus, or operation may be used. In other cases, well-known methods, apparatuses, implementations, or operations are not shown or described in detail, in order not to obscure the aspects of this disclosure.

The block diagrams shown in the accompanying drawings are merely functional entities and do not necessarily correspond to physically independent entities. In other words, the functional entities may be implemented in a software form, or in one or more hardware modules or integrated circuits, or in different networks and/or processor apparatuses and/or microcontroller apparatuses.

The flowcharts shown in the accompanying drawings are merely descriptions in some examples, do not need to include all content and operations/blocks, and do not need to be performed in the described orders either. For example, some operations/blocks may be further divided, while some operations/blocks may be combined or partially combined. Therefore, an actual execution order may change according to an actual case.

Embodiments of this disclosure relate to encoding and decoding technology of point cloud media. Descriptions of terms in this disclosure are provided as examples only and are not intended to limit the scope of the disclosure. The related technical terms are explained as follows.

Point cloud: A point cloud is a set of discrete points that are irregularly distributed in space and express a spatial structure and a surface attribute of a three-dimensional object or scene. Each point in the point cloud has at least three-dimensional position information, and may also have colors, materials, or other information based on different application scenarios. Generally, each point in the point cloud has the same quantity of additional attributes.

Slice: A point cloud slice/point cloud strip represents a set of syntax elements (such as a geometry slice and an attribute slice) of a part or all of encoded point cloud data.

Track: A track is a media data set in an encapsulation process of a media file, including a plurality of samples with time sequence. A media file may include one or more tracks. For example, a media file may include a video media track, an audio media track, and a subtitle media track. In some examples, metadata information may also be used as a media type and included in a file in the form of a metadata media track.

Sample: A sample is an encapsulation unit in an encapsulation process of a media file. A track includes a plurality of samples, and each sample corresponds to a specific timestamp information. For example, a video media track may include a plurality of samples, and a sample is usually a video frame. In embodiments of this disclosure, a sample in a point cloud media track may be a point cloud frame (that is, an image frame representing point cloud data).

Sample entry: A sample entry is configured for indicating metadata information related to all samples in a track. For example, a sample entry of a video track usually includes metadata information related to decoder initialization.

Tile: It is a hexahedral tile within a boundary spatial area of a point cloud frame. A tile of a point cloud includes one or more point cloud slices, and there is no encoding and decoding dependency between tiles of the point cloud.

DASH: dynamic adaptive streaming over HTTP. The dynamic adaptive streaming over HTTP is an adaptive bitrate streaming technology that enables high-quality streaming media to be delivered over the Internet by using a conventional HTTP network server.

MPD: media presentation description, which is media presentation description signaling in DASH and is configured for describing media segment information.

Representation: It is a combination of one or more media components in DASH. For example, a video file of a specific resolution may be considered a representation.

Adaptation sets: Sets of one or more video streams in DASH. One adaptation set may include a plurality of representations.

Media segment: A media segment is a playable segment that meets a specific media format. During playback, the media segment may be required to match with zero or a plurality of previous segments and an initialization segment.

DoF: degree of freedom, which refers to a degree of freedom for movement and generation of content interaction supported during a user watching immersive media.

3DoF: three degrees of freedom, which refers to three degrees of freedom in which the head of a user rotates about x, y, and z axes.

3DoF+: In addition to three degrees of freedom, a user further has a degree of freedom in which the user performs limited movement along x, y, and z axes.

6DoF: In addition to three degrees of freedom, a user further has a degree of freedom in which the user performs free movement along x, y, and z axes.

AVS: audio video coding standard.

MPEG: moving picture experts group, which is an organization established by the international standardization organization (ISO) and the international electrotechnical commission (IEC) to develop international standards specially for moving picture and audio compression.

ISOBMFF: ISO based media file format. The ISOBMFF is an encapsulation standard for a media file, and the most typical ISOBMFF file is an MP4 file.

Point cloud media (that is, point cloud data) may be classified into a video-based point cloud compression (VPCC)-based point cloud media and a geometry-based point cloud compression (GPCC)-based point cloud media in terms of an encoding mode. In encapsulation of a point cloud file, three-dimensional position information is usually referred to as a geometry component of the point cloud file, and attribute information is referred to as an attribute component of the point cloud file. One point cloud file has only one geometry component, but may have one or more attribute components.

The point cloud may flexibly and conveniently express a spatial structure and a surface attribute of a three-dimensional object or scene, and therefore is used widely, including a virtual reality (VR) game, a computer aided design (CAD), a geographic information system (GIS), an autonomous navigation system (ANS), a digital cultural heritage, free viewpoint broadcasting, three-dimensional immersive telepresence, three-dimensional reconstruction of biological tissues and organs, and the like.

The point cloud is obtained mainly in the following ways: computer generation, 3D laser scanning, 3D photogrammetry, and the like. A computer may generate a point cloud of a virtual three-dimensional object and scene. A point cloud of a three-dimensional object or scene in the static real-world may be obtained through 3D scanning, and a point cloud including millions of points may be obtained per second. A point cloud of a three-dimensional object or scene in the dynamic real-world may be obtained through 3D photography, and a point cloud including tens of millions of points may be obtained per second. In addition, in the medical field, a point cloud of biological tissues and organs may be obtained based on MRI, CT, and electromagnetic positioning information. Costs and a time period of obtaining point cloud data are reduced, and accuracy of data is improved by using these technologies. It is possible to obtain large amounts of point cloud data because of a change of an obtaining manner for point cloud data. With continuous accumulation of large-scale point cloud data, efficient storage, transmission, publication, sharing, and standardization of the point cloud data become the key to point cloud application.

After the point cloud media is encoded, an encoded data stream needs to be encapsulated and then transmitted to a user. Accordingly, on a point cloud media player end, the point cloud file needs to be decapsulated first, then decoded, and finally a decoded data stream is presented.

FIG. 1 is a schematic diagram of a system architecture in an example to which a technical solution of an embodiment of this disclosure may be applied.

As shown in FIG. 1, a system architecture 100 includes a plurality of terminal apparatuses. The terminal apparatuses may communicate with each other over, for example, a network 150. For example, the system architecture 100 may include a first terminal apparatus 110 and a second terminal apparatus 120 interconnected with each other over the network 150. In this embodiment of FIG. 1, the first terminal apparatus 110 and the second terminal apparatus 120 perform unidirectional data transmission.

For example, the first terminal apparatus 110 may encode point cloud data (for example, point cloud data acquired by the terminal apparatus 110) for transmission to the second terminal apparatus 120 over the network 150. Encoded point cloud data is transmitted in the form of one or more encoded point cloud bitstreams. The second terminal apparatus 120 may receive the encoded point cloud data from the network 150, decode the encoded point cloud data to restore the point cloud data, and display point cloud content based on the restored point cloud data.

In an embodiment of this disclosure, the system architecture 100 may include a third terminal apparatus 130 and a fourth terminal apparatus 140 that perform bidirectional transmission of the encoded point cloud data. The bidirectional transmission may, for example, occur during a video conference. For bidirectional data transmission, each of the third terminal apparatus 130 and the fourth terminal apparatus 140 may encode point cloud data (for example, point cloud data acquired by the terminal apparatus) for transmission over the network 150 to the other terminal apparatus of the third terminal apparatus 130 and the fourth terminal apparatus 140. Each of the third terminal apparatus 130 and the fourth terminal apparatus 140 may also receive the encoded point cloud data transmitted by the other terminal apparatus of the third terminal apparatus 130 and the fourth terminal apparatus 140, and may decode the encoded point cloud data to restore the point cloud data, and may display point cloud content on an accessible display apparatus based on the restored point cloud data.

In the embodiment of FIG. 1, the first terminal apparatus 110, the second terminal apparatus 120, the third terminal apparatus 130, and the fourth terminal apparatus 140 may be servers, personal computers, and smart phones, but the principles disclosed in this disclosure are not limited thereto. The embodiment disclosed in this disclosure is adapted to a laptop computer, a tablet computer, a media player, and/or a dedicated video conference device. The network 150 represents any quantity of networks that include, for example, wired and/or wireless communication networks, and transmit the encoded point cloud data among the first terminal apparatus 110, the second terminal apparatus 120, the third terminal apparatus 130, and the fourth terminal apparatus 140. The communication network 150 may exchange data in circuit switched channels and/or packet switched channels. The network may include a telecommunications network, a local area network, a wide area network, and/or the Internet. For the purposes of this disclosure, unless explained below, an architecture and topology of the network 150 may be immaterial to operations disclosed in this disclosure.

The server in this embodiment of this disclosure may be an independent physical server, a server cluster or a distributed system including a plurality of physical servers, or a cloud server that provides a cloud computing service. The terminal may be a smartphone, a tablet computer, a notebook computer, a desktop computer, a smart speaker, a smartwatch, an on-board terminal, a smart television, or the like, but is not limited thereto. The terminal may be directly or indirectly connected to the server via wired or wireless communications, which is not limited in this disclosure.

After the point cloud media is encoded, an encoded data stream needs to be encapsulated and then transmitted to a user. Accordingly, on a point cloud media player end, the point cloud file needs to be decapsulated first, then decoded, and finally a decoded data stream is presented.

Figure 2:
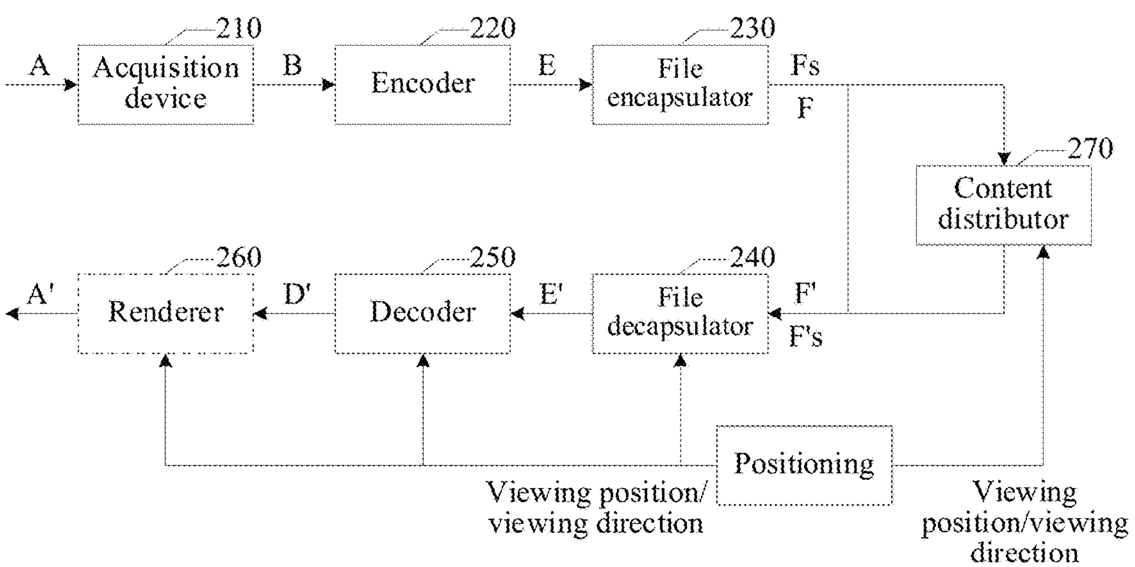
FIG. 2 is a schematic flowchart of point cloud media encoding and decoding in an application scenario according to an embodiment of this disclosure.

FIG. 2 is a schematic flowchart of point cloud media encoding and decoding in an application scenario according to an embodiment of this disclosure.

A visual scene A in the real world may be captured through point cloud data acquisition by an acquisition device 210. The acquisition device 210 may be, for example, a group of cameras or a camera device with a plurality of lenses and sensors. An acquisition result is point cloud source data B. The point cloud source data B is a frame sequence including a large quantity of point cloud frames. A point cloud frame includes data of a plurality of points. An encoder 220 may perform encoding processing on one or more point cloud frames to obtain an encoded GPCC bit stream that may include an encoded geometry bit stream and an attribute bit stream E. A file encapsulator 230 may encapsulate one or more encoded bit streams based on a specific media container file format to obtain a media file F for file playback or an initialization segment and a media segment Fs for streaming transmission. In some embodiments of this disclosure, a media container file format may be, for example, an ISO base media file format specified in ISO/IEC 14496-12 [ISOBMFF]. The file encapsulator 230 may also encapsulate metadata in the media file F or the media segment Fs.

The media file F outputted by the file encapsulator 230 is the same as a media file F' inputted to a file decapsulator 240. The file decapsulator 240 may extract an encoded bit stream E' and parse the metadata by processing the media file F' or a received media segment F's. A decoder 250 may decode the GPCC bit stream into a decoded signal D' and generate point cloud data based on the decoded signal D'. When applicable, the point cloud data may be rendered and displayed on a screen of a head mounted display or any other display device by a renderer 260 based on a current viewing position, viewing direction, or viewport determined by various types of sensors (for example, a head sensor). In addition to being used by a player to access an appropriate portion of decoded point cloud data, the current viewing position or viewing direction may also be configured for decoding optimization. In a viewport-related content distributor 270, the current viewing position and viewing direction are also transported to a policy module. The policy module may be configured to determine a track to be received by a decoder side.

In a transmission technology for the point cloud media, a streaming transmission technology is usually used to process transmission of media resources between a server and a client. A common media streaming technology includes dynamic adaptive streaming over HTTP (DASH), HTTP live streaming (HLS), smart media transport (SMT), and another technology.

The DASH is used as an example. The DASH is an adaptive bitrate streaming technology that enables high-quality streaming media to be transported over the Internet by using a conventional HTTP network server. In the DASH, content is decomposed into a series of small HTTP-based file segments, each segment includes a small length of playable content, while a total length of the content may be up to several hours (such as a movie or a live sporting event). The content may be made into alternate segments at a plurality of bitrates to provide a plurality of bitrate versions for selection. When media content is played by a DASH client, the client may automatically choose, based on a current network condition, which alternate segment to download and play. The client may choose to play a highest bitrate segment that may be downloaded timely, so that playback freezing or rebuffering events are avoided. Therefore, the DASH client can adapt well to a changing network condition and provide a high-quality playback with fewer occurrences of freezing and rebuffering. The DASH uses an HTTP network server infrastructure. The infrastructure allows a device such as an Internet television, a television set-top box, a desktop computer, a smartphone, or a tablet computer to consume multimedia content (such as video, television, and radio) transported over the Internet and to cope with a changing Internet receiving condition.

An alternative group including at least one point cloud track is encapsulated in a point cloud file. Point cloud tracks with the same point cloud content and different quality may be divided into the same alternative group. Different quality represents, for example, different amounts of data. Quality corresponds, for example, to a point cloud compression mode. When GPCC point cloud data (including a geometry component and an attribute component) is encapsulated in a single track, point cloud tracks with different quality are in the same alternative group. When the GPCC point cloud data is encapsulated in a plurality of tracks, geometry component tracks of point cloud content with different quality are in the same alternative group, and an attribute component track may be associated with a geometry component track.

Figure 3:
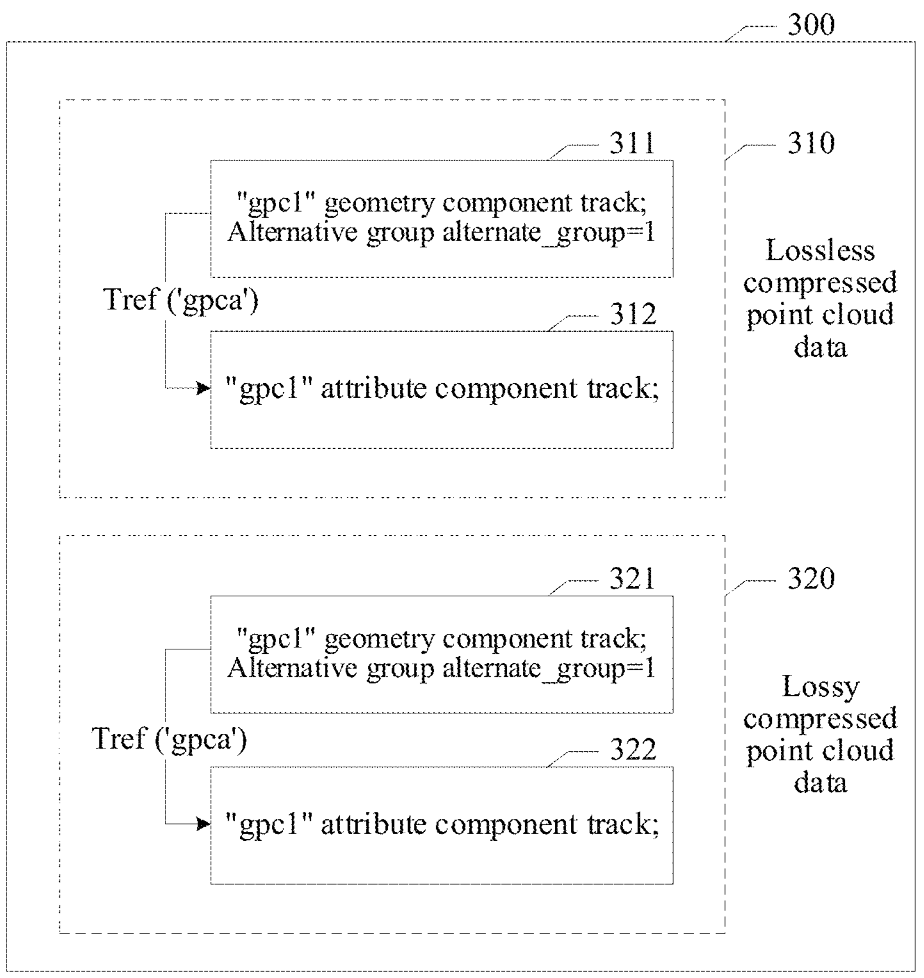
FIG. 3 is a schematic diagram of an alternative group encapsulated in a plurality of tracks in related art of this disclosure.

FIG. 3 is a schematic diagram of an alternative group encapsulated in a plurality of tracks in related art of this disclosure. As shown in FIG. 3, an alternative group 300 includes first point cloud data 310 and second point cloud data 320 having the same point cloud content. The first point cloud data 310 is lossless coded GPCC (Lossless coded GPCC)-based point cloud data with a high point cloud quality, and the second point cloud data 320 is lossy coded GPCC (Lossy coded GPCC)-based point cloud data with a low point cloud quality.

The first point cloud data 310 includes a first geometry component track 311 and a first attribute component track 312 associated with the first geometry component track 311. The second point cloud data 320 includes a second geometry component track 321 and a second attribute component track 322 associated with the second geometry component track 321.

Figure 4:
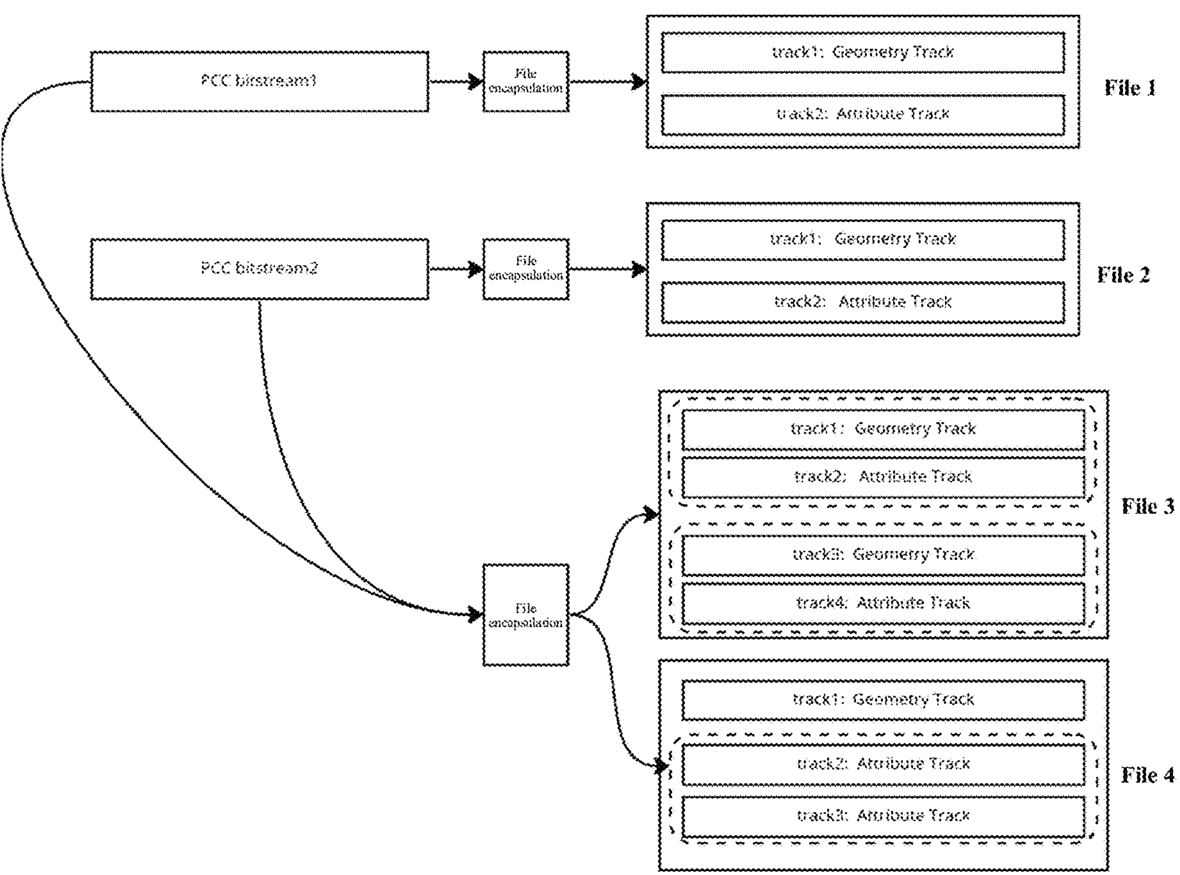
FIG. 4 shows a file encapsulation mode that may be used for two point cloud bitstreams alternative to each other in an embodiment of this disclosure.

FIG. 4 shows a file encapsulation mode that may be used for two point cloud bitstreams alternative to each other in an embodiment of this disclosure. As shown in FIG. 4, a point cloud bitstream bitstream1 and a point cloud bitstream bitstream2 may be encapsulated in the following three different file encapsulation modes.

(1) The point cloud bitstream bitstream1 and the point cloud bitstream bitstream2 are respectively encapsulated into two different files, such as a file 1 and file 2 shown in the figure. The file 1 includes a geometry component track track1 and an attribute component track track2 that correspond to the point cloud bitstream bitstream1, and the file 2 includes a geometry component track track1 and an attribute component track track2 that correspond to the point cloud bitstream bitstream2.

(2) The point cloud bitstream bitstream1 and the point cloud bitstream bitstream2 are encapsulated into the same file, and the two point cloud bitstreams are alternative to each other, such as a file 3 shown in the figure. In this case, a geometry component track track1 and an attribute component track track2 correspond to the point cloud bitstream bitstream1, and a geometry component track track3 and an attribute component track track4 correspond to the point cloud bitstream bitstream2.

(3) If geometric information in the point cloud bitstream bitstream1 and point cloud bitstream bitstream2 is completely consistent, in other words, the geometric information is encoded in completely the same encoding mode, a repeated geometry component track may be omitted in this case, and the point cloud bitstream bitstream1 and the point cloud bitstream bitstream2 may be encapsulated into a file 4. In this case, only an attribute component track track2 and an attribute component track track3 are alternative to each other, a geometry component track track1 and the attribute component track track2 correspond to the point cloud bitstream bitstream1, and the geometry component track track1 and the attribute component track track3 correspond to the point cloud bitstream bitstream2.

Figure 5:
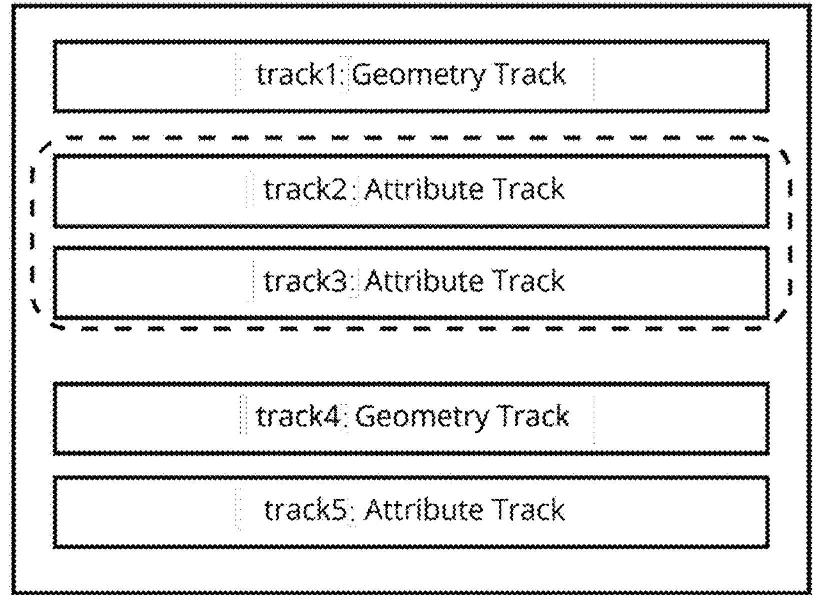
FIG. 5 shows a file encapsulation mode that may be used for three point cloud bitstreams alternative to each other in an embodiment of this disclosure.

FIG. 5 shows a file encapsulation mode that may be used for three point cloud bitstreams alternative to each other in an embodiment of this disclosure. As shown in FIG. 5, based on the third file encapsulation mode shown in FIG. 4, the geometry component track track1 and the attribute component track track2 correspond to the point cloud bitstream bitstream1, the geometry component track track1 and the attribute component track track3 correspond to the point cloud bitstream bitstream2, and a geometry component track track4 and an attribute component track track5 correspond to a point cloud bitstream bitstream3. Because there is no repeated geometry component track between the point cloud bitstream bitstream3 and the point cloud bitstream bitstream1 or the point cloud bitstream bitstream2, it is not enough to simply indicate an alternative relationship between the track2 and the track3. It is also needed to additionally indicate alternative relationships between track1 and track2, track1 and track3, and track4 and track5. Otherwise, alternative relationships between various point cloud bitstreams cannot be indicated clearly.

In response to a problem that an alternative relationship between point cloud bitstreams cannot be indicated clearly in related art, an embodiment of this disclosure provides a point cloud alternative content file encapsulation and signaling indication method. According to the method, an alternative relationship at a point cloud bitstream level can be indicated, and a shared component in alternative bitstreams, including a shared geometry component and a shared attribute component, can be indicated.

FIG. 6 shows a point cloud encapsulation method based on an indicated alternative relationship between point cloud bitstreams in an embodiment of this disclosure. The method may be performed in an electronic device such as a server side, a player side, or an intermediate node of a point cloud media system.

As shown in FIG. 6, the point cloud encapsulation method based on an indicated alternative relationship between point cloud bitstreams may include the following operations S610 and S620.

S610: Obtain an information data box for a content entity carrying point cloud data, the information data box including an entity identification field (also referred to as entity identifying field), and the entity identification field being configured for indicating whether the content entity independently belongs to one point cloud bitstream or is shared by at least two point cloud bitstreams alternative to each other.

S620: Encapsulate the content entity into a point cloud file based on the information data box.

The content entity in this embodiment of this disclosure may be a point cloud track or a point cloud project. One point cloud track may include at least one of the following: geometry data or attribute data. For example, when one point cloud track includes geometry data and does not include attribute data, the point cloud track may be referred to as a geometry component track. When one point cloud track includes attribute data and does not include geometry data, the point cloud track may be referred to as an attribute component track. The point cloud track includes a plurality of point cloud samples with time sequence. For example, one point cloud sample in one point cloud track may be one point cloud frame with a corresponding timestamp, which is equivalent to a video frame in a dynamic video. In other words, one point cloud frame may be considered as a video frame for representing point cloud data. The point cloud project includes a plurality of point cloud samples with non-time sequence. For example, one point cloud sample in the point cloud project may be one point cloud image of a plurality of point cloud images that have no time sequence relationship with each other, which is equivalent to an image in a static atlas.

In this embodiment of this disclosure, different values of the entity identification field configured in the information data box can indicate an alternative relationship between point cloud bitstreams. For example, a value of an entity identification field corresponding to a point cloud track track1 is 1, indicating that the point cloud track track1 is shared by at least two point cloud bitstreams alternative to each other. For example, the point cloud track is included in two alternative point cloud bitstreams bitstream1 and bitstream2. Values of entity identification fields corresponding to a point cloud track track2 and a point cloud track track3 are both 0, indicating that each of the point cloud track track2 and point cloud track track3 independently belongs to one point cloud bitstream. For example, the point cloud bitstream, namely, bitstream1 may include the point cloud track track1 and the point cloud track track2, and another point cloud bitstream, namely, bitstream2 may include the point cloud track track1 and the point cloud track track3. According to an indication of the entity identification field, an alternative relationship between the point cloud bitstream bitstream1 and the point cloud bitstream bitstream2 can be clearly recognized.

In conclusion, in the method 600, the information data box may be added to the content entity to indicate whether the content entity is reused by the point cloud bitstream, so that only one copy of the reused content entity can be retained, thereby reducing bitstream and improving data transmission efficiency. In addition, indicating whether the content entity is reused by the point cloud bitstream is beneficial to clearly define an alternative relationship between different point cloud bitstreams, so that a plurality of alternative point cloud bitstreams can be generated based on the alternative relationship. The alternative relationship here between the plurality of point cloud bitstreams is a relationship in which any two of the plurality of point cloud bitstreams serve as backups for each other. In other words, the plurality of alternative point cloud bitstreams are different bitstream options with various quality generated for the same source point cloud data. In short, in the method of this embodiment of this disclosure, an alternative point cloud bitstream in the point cloud file may be recognized effectively.

In an embodiment of this disclosure, the information data box further includes an alternative identification field. The alternative identification field is configured for indicating an identifier of an alternative group including the content entity. For example, in an information data box of the point cloud track track2, a value of an alternative identification field is 2. In an information data box of the point cloud track track3, a value of an alternative identification field is also 2. Therefore, it may be represented that the point cloud track track2 and the point cloud track track3 are included in the same alternative group having an identifier of 2.

In an embodiment, when the entity identification field indicates that the content entity is shared by the at least two point cloud bitstreams alternative to each other, the information data box further includes a set identification field. The set identification field is configured for indicating an identifier of an alternative group combined with the content entity. In an embodiment, when the entity identification field indicates that the content entity is shared by the at least two point cloud bitstreams alternative to each other, the information data box further includes a set quantity field. The set quantity field is configured for indicating a quantity of alternative groups combined with the content entity.

In conclusion, the information data box of this disclosure may be configured for determining an organizational relationship between different content entities, so that the content entities can be combined into, by using the information data box, a plurality of point cloud bitstreams having an alternative relationship.

For example, in an information data box of the point cloud track track1, a value of an entity identification field is 1, indicating that the track is included in two alternative point cloud bitstreams bitstream1 and bitstream2. Values of entity identification fields corresponding to a point cloud track track2 and a point cloud track track3 are both 0, and values of alternative identification fields are both 2, indicating that the point cloud track track2 and point cloud track track3 are included in the same alternative group having the identifier of 2. The point cloud bitstream, namely, bitstream1 may include the point cloud track track1 and the point cloud track track2, and another point cloud bitstream, namely, bitstream2 may include the point cloud track track1 and the point cloud track track3. To identify a data association relationship between the point cloud bitstream bitstream1 and the point cloud bitstream bitstream2, the set quantity field and the set identification field may be configured in the information data box of the point cloud track track1. A value of the set quantity field is 1, and a value of the set identification field is 2, indicating that the point cloud track track1 is only used by one alternative group having the identifier of 2 to constitute the point cloud bitstream bitstream1 and the point cloud bitstream bitstream2 alternative to each other.

For another example, the point cloud bitstream bitstream1 and the point cloud bitstream bitstream2 also include a shared point cloud track track4, and the point cloud track track4 is included in another alternative group having an identifier of 3. Therefore, in the information data box of the point cloud track track1, a value of the set quantity field may be configured as 2, and a value of the set identification field may be configured as 2 and 3, indicating that the point cloud track track1 is combined with two alternative groups respectively having identifiers of 2 and 3 to constitute the point cloud bitstream bitstream1 (including the point cloud track track1, the point cloud track track2, and the point cloud track track4) and the point cloud bitstream bitstream2 (including the point cloud track track1, the point cloud track track3, and the point cloud track track4) alternative to each other.

In an embodiment of this disclosure, when the content entity is a point cloud track, the information data box is included in a sample entry of the point cloud track.

In this embodiment of this disclosure, syntax extension may be performed on an ISOBMFF data box of the point cloud track to achieve the foregoing alternative identification of the point cloud bitstream.

FIG. 7 shows a data structure of a newly added alternative information data box in an embodiment of this disclosure.

- shared_alternative_track_flag refers to an entity identification field. When a value of the entity identification field is 0, it indicates that a current point cloud track is a track in a set including a plurality of alternative tracks (that is, an alternative group). To be specific, the point cloud track is shared by at least two point cloud bitstreams alternative to each other. When the value of the entity identification field is 1, it indicates that the current point cloud track independently belongs to one point cloud bitstream and may be combined with an alternative group specified by a set identification field to obtain a plurality of bitstreams.
- alternative_id refers to an alternative identification field and indicates an identifier of an alternative group including the current track.
- num_share_alternative_group refers to a set quantity field and indicates a quantity of alternative groups that share the current point cloud track, to be specific, indicates a quantity of alternative groups combined with a content entity.
- share_alternative_group_id refers to a set identification field and indicates an identifier of an alternative group that shares the current point cloud track, to be specific, indicates an identifier of an alternative group combined with the content entity.

In an embodiment of this disclosure, when a content entity is encapsulated into a point cloud file based on an information data box, a variety of different encapsulation modes may be used, for example, single-track encapsulation, component-based multi-track encapsulation, and slice base multi-track encapsulation. The slice base multi-track encapsulation may further include a mode in which geometry data and attribute data are encapsulated together, or a mode in which geometry data and attribute data are encapsulated separately.

Figure 8:
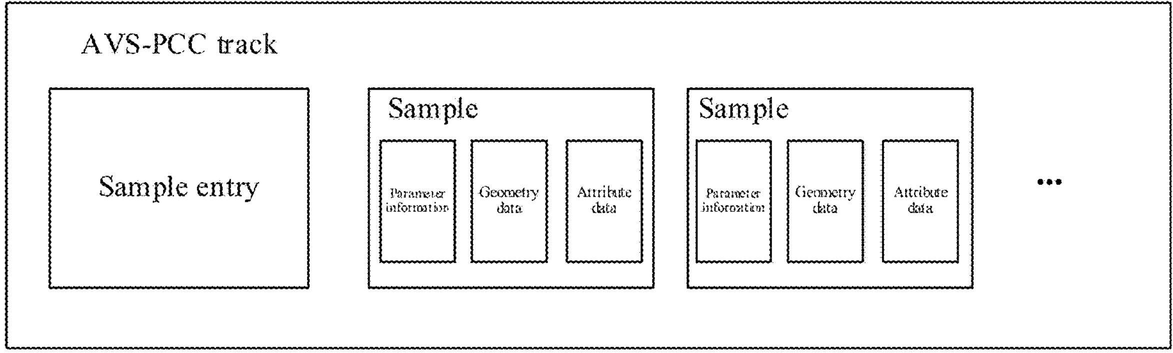
FIG. 8 shows a point cloud file encapsulation structure for single-track encapsulation in an embodiment of this disclosure.

FIG. 8 shows a point cloud file encapsulation structure for single-track encapsulation in an embodiment of this disclosure. As shown in FIG. 8, one point cloud track is independently encapsulated as one point cloud file. The point cloud track includes a sample entry and a plurality of point cloud samples. Each point cloud sample may include parameter information, geometry data, and attribute data.

Figure 9:
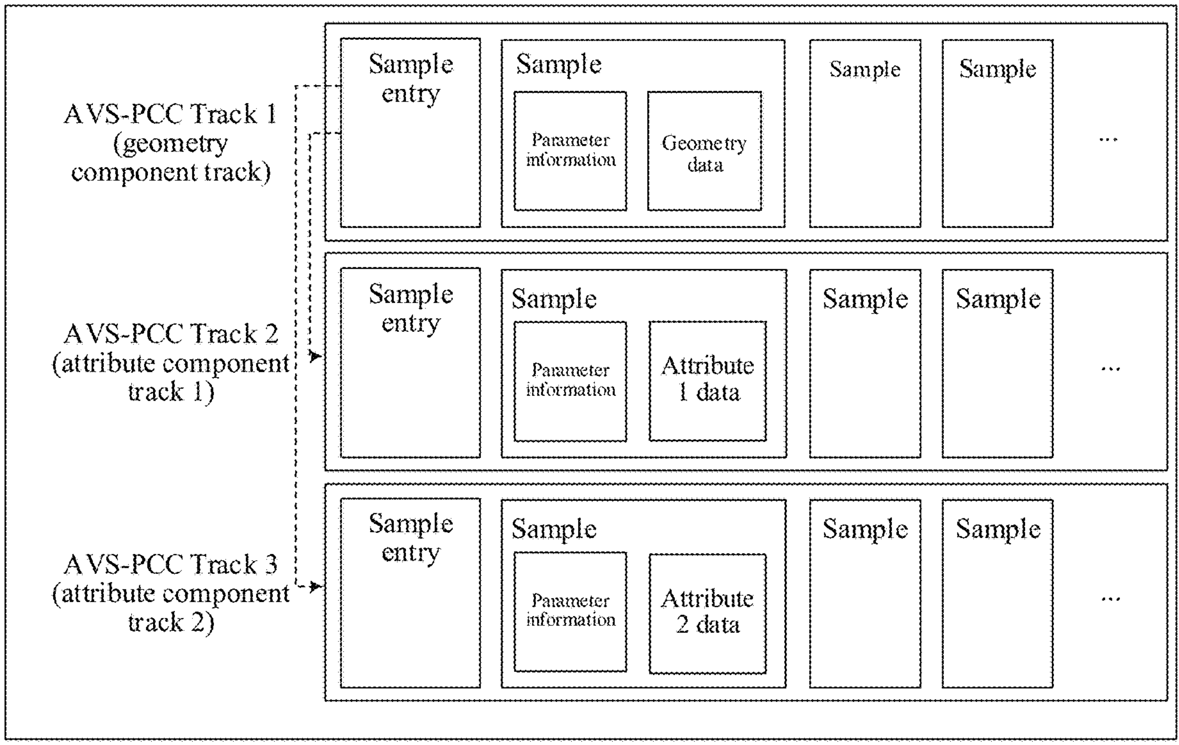
FIG. 9 shows a point cloud file encapsulation structure for component-based multi-track encapsulation in an embodiment of this disclosure.

FIG. 9 shows a point cloud file encapsulation structure for component-based multi-track encapsulation in an embodiment of this disclosure. As shown in FIG. 9, one geometry component track track1 and two attribute component tracks track2 and track3 are encapsulated together into one point cloud file. The geometry component track track1 includes a sample entry and a plurality of samples. Each sample includes parameter information and geometry data. The attribute component track track2 includes a sample entry and a plurality of samples. Each sample includes parameter information and attribute 1 data. The attribute component track track3 includes a sample entry and a plurality of samples. Each sample includes parameter information and attribute 2 data. An attribute 1 and Attribute 2 are two point cloud attributes with different quality. A point cloud attribute may be, for example, a color, a material, or other attribute information.

In an embodiment of this disclosure, when a point cloud bitstream uses a component-based multi-track encapsulation mode, the point cloud bitstream includes a geometry component track for encapsulating point cloud geometry data and an attribute component track for encapsulating point cloud attribute data.

In an embodiment, a content entity related to at least one point cloud bitstream includes at least one geometry component track for encapsulating point cloud geometry data and at least one attribute component track for encapsulating point cloud attribute data. In an information data box of one of the at least one geometry component track, when an entity identification field indicates that the geometry component track is shared by at least two point cloud bitstreams alternative to each other, and a set identification field indicates an identifier of an alternative group including the attribute component track, the geometry component track and an attribute component track in each alternative group specified by the identifier of the alternative group are configured for combining into a point cloud bitstream. In conclusion, the information data box of this disclosure may be configured for determining an organizational relationship between different content entities, so that the content entities can be combined into, by using the information data box, a plurality of point cloud bitstreams having an alternative relationship.

When an entity identification field in an information data box of a content entity in the point cloud file indicates that the content entity independently belongs to one point cloud bitstream, and an identifier of an alternative group including the content entity is not included in an information data box of another content entity in the point cloud file, the content entity is independently used as a single point cloud bitstream, and the point cloud bitstream is alternative to a point cloud bitstream to which another content entity in the alternative group including the content entity belongs.

In an embodiment, when the information data box is included in a sample entry of the geometry component track, the entity identification field indicates that the geometry component track is separately combined with at least two attribute component tracks in the alternative group to constitute at least two alternative point cloud bitstreams.

When the information data box is included in a sample entry of the attribute component track, the entity identification field is configured for indicating that the attribute component track is one track in the alternative group, or for indicating that the attribute component track is separately combined with at least two attribute component tracks in the alternative group to constitute alternative point cloud bitstreams.

For example, in an application scenario of this embodiment of this disclosure, when a data box is included in a sample entry of a point cloud geometry component track, a value of a shared_alternative_track_flag field in the data box needs to be 1, which indicates that the point cloud geometry component track is shared by a plurality of alternative attribute component tracks.

When the data box is included in a sample entry of a point cloud attribute component track, if a value of a shared_alternative_track_flag field in the data box is 1, a point cloud geometry component track corresponding to the point cloud attribute component track necessarily includes GPCCAlternativeInfoBox (that is, an information data box), and the value of the shared_alternative_track_flag field needs to be 1, which indicates that the point cloud attribute component and the corresponding point cloud geometry track are shared by another alternative attribute component track.

Figure 10:
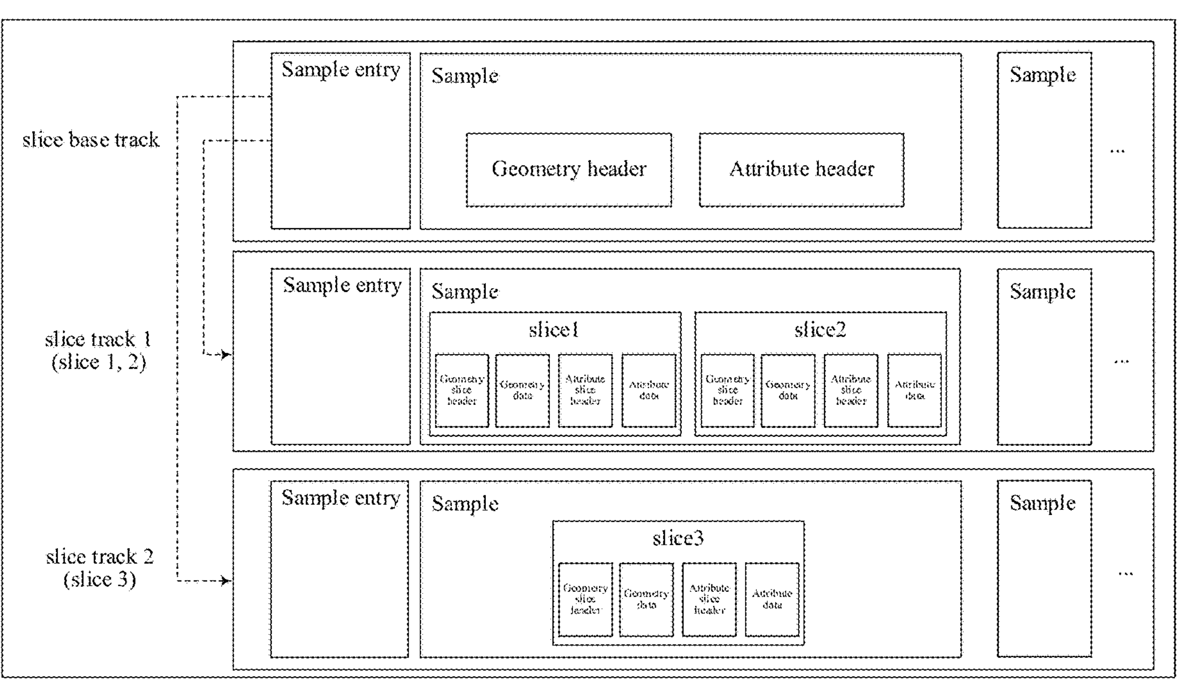
FIG. 10 shows a point cloud file encapsulation structure for slice-based multi-track encapsulation (where geometry data and attribute data are encapsulated together) in an embodiment of this disclosure.

FIG. 10 shows a point cloud file encapsulation structure for slice-based multi-track encapsulation (where geometry data and attribute data are encapsulated together) in an embodiment of this disclosure. As shown in FIG. 10, a point cloud file includes three point cloud slice tracks, namely, slice base track, slice track1, and slice track 2.

The point cloud slice track slice base track includes a sample entry and a plurality of samples. Each sample includes a geometry header and an attribute header for storing metadata.

The point cloud slice track slice track 1 includes a sample entry and a plurality of samples. Each sample may include a geometry slice header, geometry data, an attribute slice header, and attribute data of a point cloud slice slice1, and a geometry slice header, geometry data, an attribute slice header, and attribute data of a point cloud slice slice2.

The point cloud slice track slice track 2 includes a sample entry and a plurality of samples. Each sample may include a geometry slice header, geometry data, an attribute slice header, and attribute data of a point cloud slice slice3.

Figure 11:
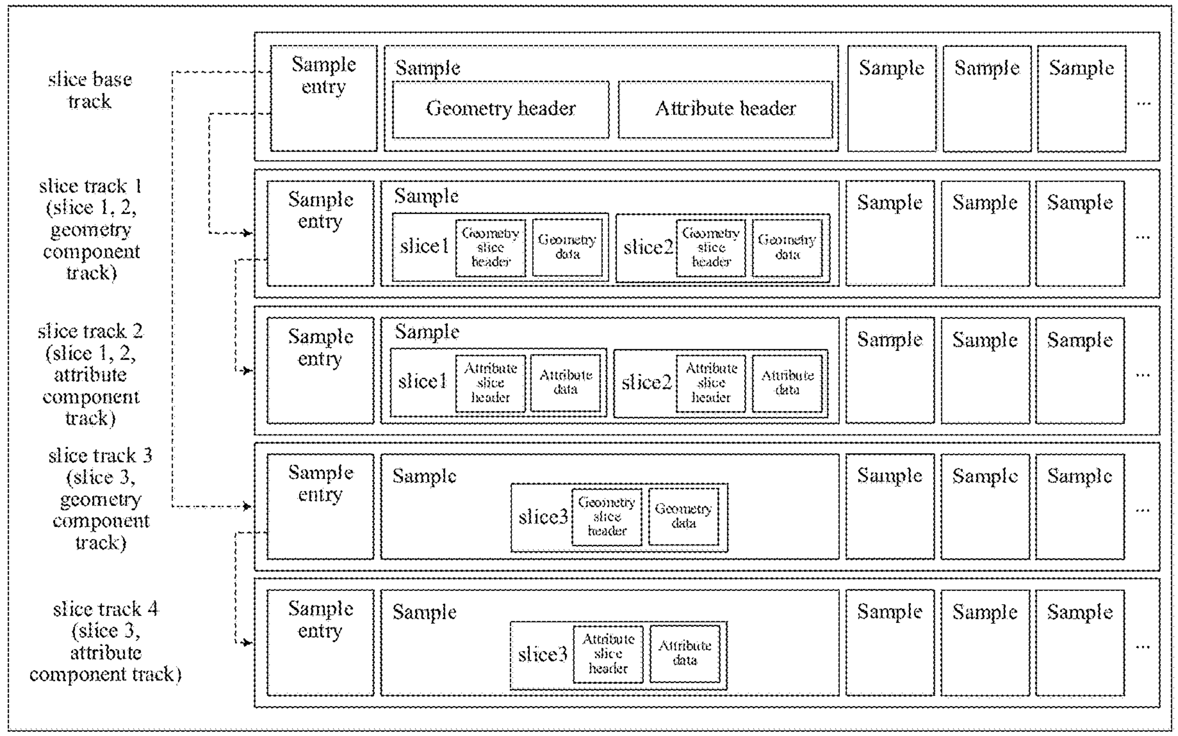
FIG. 11 shows a point cloud file encapsulation structure for slice-based multi-track encapsulation (where geometry data and attribute data are encapsulated respectively) in an embodiment of this disclosure.

FIG. 11 shows a point cloud file encapsulation structure for slice-based multi-track encapsulation (where geometry data and attribute data are encapsulated respectively) in an embodiment of this disclosure. As shown in FIG. 11, a point cloud file includes five point cloud slice tracks, namely, slice base track, slice track1, slice track 2, slice track 3, and slice track 4.

The point cloud slice track slice base track includes a sample entry and a plurality of samples. Each sample includes a geometry header and an attribute header for storing metadata.

The point cloud slice track slice track1 is a geometry component track, including a sample entry and a plurality of samples. Each sample may include a geometry slice header and geometry data of a point cloud slice slice1, and a geometry slice header and geometry data of a point cloud slice slice2.

The point cloud slice track slice track 2 is an attribute component track, including a sample entry and a plurality of samples. Each sample may include an attribute slice header and attribute data of the point cloud slice slice1, and an attribute slice header and attribute data of the point cloud slice slice2.

The point cloud slice track slice track 3 is a geometry component track, including a sample entry and a plurality of samples. Each sample may include a geometry slice header and geometry data of a point cloud slice slice3.

The point cloud slice track slice track 4 is an attribute component track, including a sample entry and a plurality of samples. Each sample may include an attribute slice header and attribute data of the point cloud slice slice3.

In an embodiment, a content entity related to at least one point cloud bitstream includes a plurality of point cloud slice tracks using a point cloud slice as a point cloud sample. When a point cloud slice track includes point cloud geometry data, an entity identification field indicates that the point cloud slice track is shared by at least two point cloud bitstreams alternative to each other, and a set identification field specifies an identifier of an alternative group, the point cloud slice track and a point cloud slice track in each alternative group specified by the identifier of the alternative group are configured for combining into a point cloud bitstream.

In an embodiment of this disclosure, when the point cloud bitstream uses a slice base multi-track encapsulation mode, the point cloud bitstream includes a point cloud slice track using a point cloud slice as a point cloud sample.

When an information data box is included in a sample entry of the point cloud slice track, and the point cloud slice track includes the point cloud geometry data, the entity identification field indicates that the point cloud slice track is separately combined with at least two tracks including point cloud attribute data in an alternative group to constitute at least two alternative point cloud bitstreams.

When the information data box is included in a sample entry of the point cloud slice track, and the point cloud slice track includes the point cloud attribute data, the entity identification field is configured for indicating that the point cloud slice track is one track in an alternative group, or for indicating that the point cloud slice track is separately combined with at least two tracks including the point cloud attribute data in the alternative group to constitute at least two alternative point cloud bitstreams.

For example, in an application scenario of this embodiment of this disclosure, when a data box is included in a sample entry of a point cloud slice track, and the point cloud slice track includes geometry component data, a value of a shared_alternative_track_flag field in the data box needs to be 1, which indicates that a point cloud geometry component track is shared by a set of a plurality of alternative point cloud slice tracks including attribute components (that is, an alternative group including a plurality of point cloud slice tracks).

When the data box is included in a sample entry of a point cloud slice track, and the point cloud slice track includes attribute component data, if a value of the shared_alternative_track_flag field in the data box is 1, a point cloud slice track that includes geometry component data and that corresponds to the point cloud slice track necessarily includes GPCCAlternativeInfoBox, and the value of the shared_alternative_track_flag field needs to be 1, which indicates that the point cloud slice track including the attribute components and the corresponding point cloud slice track including the geometry component data are shared by a set of at least two other alternative point cloud slice tracks including attribute components (that is, an alternative group including point cloud slice tracks).

In an embodiment of this disclosure, based on the AVS standard, an alternative relationship between point cloud bitstreams may alternatively be indicated by extending an alternative information structure and a related track group and entity group.

FIG. 12 shows a point cloud alternative information structure based on the AVS standard in an embodiment of this disclosure. As shown in FIG. 12, when there are a plurality of point cloud tracks alternative to each other, a point cloud alternative information structure AvsPCCAlternativeInfoStruct is configured for indicating a difference between a plurality of point cloud tracks in an alternative group.

When a value of quality_ranking_flag is 1, it indicates that tracks in the alternative group have an alternative relationship in terms of quality. When a value of quality_ ranking_flag is 0, it indicates that tracks in the alternative group have no alternative relationship in terms of quality.

quality_ranking indicates quality ranking information. A less value of this field indicates a higher quality of a corresponding track. For example, different quality corresponds to different amounts of data.

When a value of shared_alternative_track_flag is 0, it indicates that a current point cloud track is a track in a set of a plurality of tracks (that is, an alternative group including a plurality of alternative tracks), to be specific, indicates that the current point cloud track independently belongs to one point cloud bitstream. When a value of shared_alternative_track_flag is 1, it indicates that a current point cloud track is shared by a plurality of tracks in a set of alternative tracks. In other words, the current point cloud track is shared by at least two point cloud bitstreams alternative to each other.

alternative_id indicates an identifier of an alternative group including the current track.

num_share_alternative_group indicates a quantity of sets of alternative tracks that share the current point cloud track, to be specific, indicates a quantity of alternative groups combined with a content entity.

share_alternative_group_id indicates an identifier of an alternative group that shares the current point cloud track, to be specific, is configured for indicating an identifier of an alternative group combined with the content entity.

FIG. 13 shows a data box structure of a point cloud alternative track group based on the AVS standard in an embodiment of this disclosure. There may be an alternative relationship between point cloud tracks, and tracks alternative to each other belong to the same point cloud alternative track group.

FIG. 14 shows a data box structure of a non-time sequence point cloud media alternative group based on the AVS standard in an embodiment of this disclosure. There may be an alternative relationship between point cloud projects, and projects alternative to each other belong to the same point cloud alternative group.

group_id indicates an identifier of a current entity group.

num_entities_in_group indicates a quantity of content entities (tracks or projects) in the current entity group.

entity_id indicates an identifier of a content entity.

AvsPCCAlternativeInfoStruct indicates alternative information of the current content entity.

In an embodiment of this disclosure, after a content entity is encapsulated as a point cloud file based on an information data box, a signaling file for describing the point cloud file may be further generated. The signaling file includes an entity identification element, and the entity identification element is configured for indicating that the content entity is an entity in an alternative group, or for indicating that the content entity is included in at least two alternative point cloud bitstreams.

In an embodiment of this disclosure, the signaling file further includes an alternative identification element. The alternative identification element is configured for indicating an identifier of an alternative group including the content entity.

In an embodiment of this disclosure, when the entity identification element indicates that the content entity is included in at least two alternative point cloud bitstreams, the signaling file further includes a set identification element, and the set identification element is configured for indicating an identifier of the alternative group.

DASH signaling is used as an example. In an application scenario of this embodiment of this disclosure, a SupplementalProperty element with a @schemeIdUri attribute value of "urn: mpeg: mpegI: gpcc: 2020: alternativeInfo" may be configured in the DASH signaling to represent an alternative information descriptor. The descriptor is configured for defining specific information of a representation corresponding to a track in the alternative group.

The descriptor may describe a media resource at a representation level, an adaptation set level, or a preselection level. When the descriptor describes the adaptation set level or the preselection level, it means that all representations in the adaptation set level or the preselection level correspond to the same alternative information.

One or more alternative information descriptors may exist in MPD signaling.

Table 1 shows syntax and semantics of the alternative information descriptor in the MPD signaling.

TABLE 1

| Element and attribute of an alternative information descriptor | Use | Data type | Description |
|---|---|---|---|
| PCCAlternativeInfo | 0 . . . N | gpcc: PCCAlternativeInfo | It is configured for indicating alternative information of a corresponding media resource. |
| PCCAlternativeInfo@ shared_alternative_track_flag | Mandatory | xs: bool | When a value is 0, it indicates that a point cloud track corresponding to a current representation is a track in a set of a plurality of alternative tracks. When a value is 1, it indicates that a point cloud track corresponding to the current representation is shared by a plurality of tracks in a set of alternative tracks. |
| PCCAlternativeInfo alternative_id | Mandatory | xs: unsignedInt | It indicates an identifier of an alternative group including the point cloud track corresponding to a current representation. |

TABLE 1-continued

| Element and attribute of an alternative information descriptor | Use | Data type | Description |
|---|---|---|---|
| PCCAlternativeInfo @ share_alternative_group_id | Conditional mandatory | xs: UIntVectorType | It indicates identifiers of one or more alternative groups in which a point cloud track corresponding to a current representation is shared. This field is mandatory when a value of PCCAlternativeInfo@ shared_alternative_track_flag is 1. |

In an embodiment of this disclosure, a preselection structure in the DASH signaling may alternatively be used to indicate an alternative relationship between point cloud bitstreams. For example, in this embodiment of this disclosure, each alternative track may be organized into one adaptation set, and a series of adaptation sets may be identified by using an @preselectionComponents element in preselection, and an @id element in preselection is equal to a corresponding alternative group id.

Alternatively, in this embodiment of this disclosure, each alternative track may be organized into one representation, and a series of adaptation sets is identified by using an @preselectionComponents element in preselection, and an @id element in preselection is equal to a corresponding alternative group id.

Figure 15A:
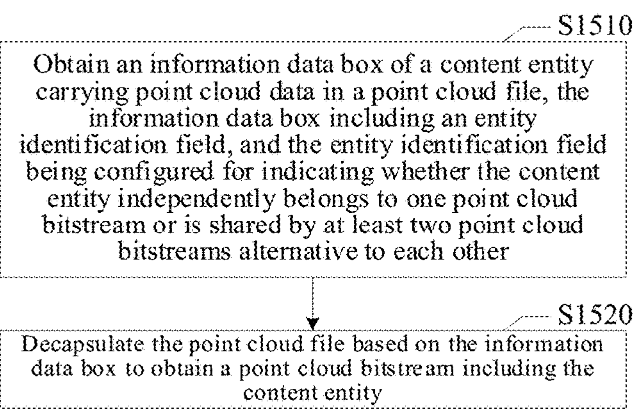
FIG. 15A shows a point cloud decapsulation method based on an indicated alternative relationship between point cloud bitstreams in an embodiment of this disclosure.

FIG. 15A shows a point cloud decapsulation method based on an indicated alternative relationship between point cloud bitstreams in an embodiment of this disclosure. The method may be performed in an electronic device such as a server side, a player side, or an intermediate node of a point cloud media system.

As shown in FIG. 15A, the point cloud decapsulation method based on an indicated alternative relationship between point cloud bitstreams may include the following operations S1510 and S1520.

S1510: Obtain an information data box of a content entity carrying point cloud data in a point cloud file, the information data box including an entity identification field, and the entity identification field being configured for indicating whether the content entity independently belongs to one point cloud bitstream or is shared by at least two point cloud bitstreams alternative to each other.

S1520: Decapsulate the point cloud file based on the information data box to obtain a point cloud bitstream including the content entity.

In conclusion, in the method, the information data box of the content entity may be obtained to indicate whether the content entity is reused by the point cloud bitstream, so that only one copy of the reused content entity can be retained, thereby reducing bitstream and improving data transmission efficiency. In addition, indicating whether the content entity is reused by the point cloud bitstream is beneficial to clearly define an alternative relationship between different point cloud bitstreams, so that a plurality of alternative point cloud bitstreams can be generated based on the alternative relationship. The alternative relationship here between the plurality of point cloud bitstreams is a relationship in which any two of the plurality of point cloud bitstreams serve as backups for each other. In other words, the plurality of alternative point cloud bitstreams are different bitstream options with various quality generated for the same source point cloud data. In short, in the method of this embodiment of this disclosure, an alternative point cloud bitstream in the point cloud file may be recognized effectively.

In an embodiment of this disclosure, before obtaining the information data box of the content entity in the point cloud file, the method further includes:

obtaining a signaling file for describing the point cloud file, the signaling file including an entity identification element, and the entity identification element being configured for indicating whether the content entity independently belongs to one point cloud bitstream or is shared by at least two point cloud bitstreams alternative to each other; and requesting, based on the signaling file, a content entity belonging to at least one point cloud bitstream in the point cloud file for the at least one point cloud bitstream.

For implementation details of the point cloud decapsulation method in this embodiment of this disclosure, reference may be made to the foregoing embodiment of the point cloud encapsulation method. This is not described herein again.

The following uses an application scenario as an example to describe a solution for point cloud transmission between a server and a client according to the point cloud encapsulation method and the point cloud decapsulation method provided in embodiments of this disclosure.

The solution for point cloud transmission in the application scenario includes the following processes.

(1) The server encapsulates a point cloud bitstream into a point cloud file.

When N point cloud bitstreams are alternative versions of the same content with different quality, if geometry data of M (greater than 1) point cloud bitstreams is obtained in exactly the same encoding mode, and the M point cloud bitstreams are encapsulated in a component-based multi-track encapsulation mode, only one geometry component track is retained, and a relationship between a shared geometry component track and another alternative attribute component track is indicated.

In the M point cloud bitstreams, if one or more groups of point cloud attribute data of K point cloud bitstreams are obtained in exactly the same encoding mode, for a group of point cloud attribute data of the same type, only one attribute component track is retained, and a relationship between a shared point cloud attribute track and the geometry component track is indicated.

Figure 15B:
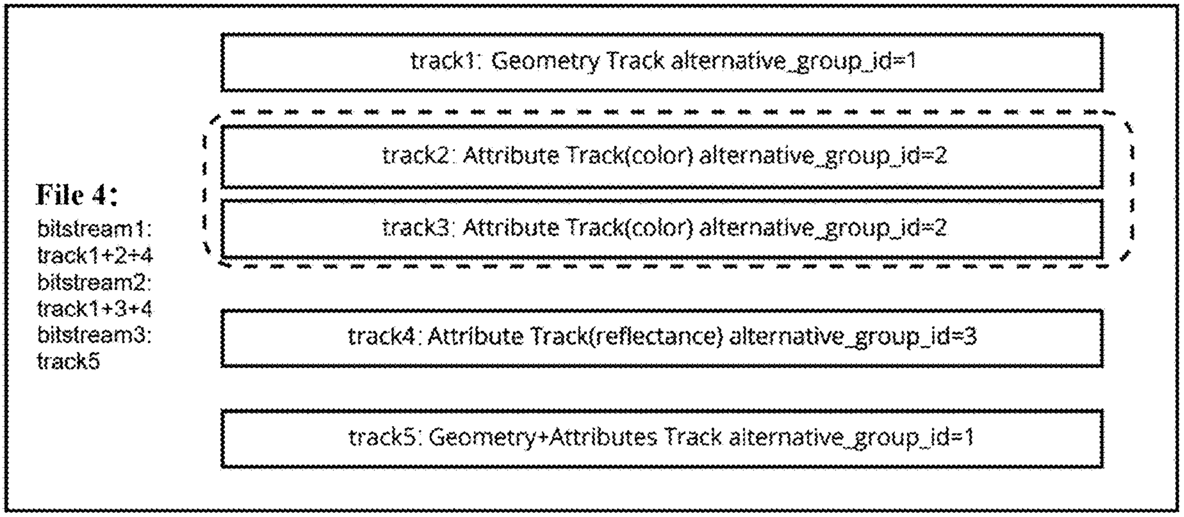
FIG. 15B shows a point cloud file structure obtained by performing point cloud encapsulation in an application scenario according to an embodiment of this disclosure.

FIG. 15B shows a point cloud file structure obtained by performing point cloud encapsulation in an application scenario according to an embodiment of this disclosure.

As shown in FIG. 15B, a server encapsulates a point cloud bitstream into a point cloud file. Three point cloud bitstreams, namely, bitstream1, bitstream2, and bitstream3 are alternative versions of the same content with different quality. Geometry data of the point cloud bitstream bitstream1 and the point cloud bitstream bitstream2 is obtained in exactly the same encoding mode, and the point cloud bitstream bitstream1 and the point cloud bitstream bitstream2 are encapsulated in a component-based multi-track encapsulation mode. An attribute (such as reflectivity) in bitstream1 and bitstream2 is also obtained in exactly the same encoding mode, and the bitstream3 is encapsulated in a single track mode.

In the point cloud file, for a geometry track and a reflectivity attribute track in bitstream1 and bitstream2, only one track is retained, and relationships between a shared geometry track, a reflectivity attribute track, and two color attribute tracks are indicated.

```
Track1: { shared_alternative_track_flag =1; alternative_id (or
alternative_group_id) =1; num_share_alternative_group =2;
share_alternative_group_id ={2,3}}
Track2: { shared_alternative_track_flag =0; alternative_id =2}
Track3: { shared_alternative_track_flag =0; alternative_id =2}
Track4: { shared_alternative_track_flag =1; alternative_id =3;
num_share_alternative_group =1; share_alternative_group_id ={2}}
Track5: { shared_alternative_track_flag =0; alternative_id =1}
```

(2) The server transmits all point cloud files to the client.

(3) The client receives a complete point cloud file F1. The complete point cloud file F1 includes all alternative point cloud tracks. When decapsulating, decoding, and presenting the point cloud file, the client selects a track in F1 for decoding and presentation based on device performance and presentation effect requirements of a user and corresponding metadata information in the file.

According to data box information in the point cloud file, the client has three options:

$$Track1 + Track2 + Track4;$$

$$Track1 + Track3 + Track4; \text{ and}$$

$$Track5.$$

The following uses another application scenario as an example to describe a solution for point cloud transmission between a server and a client according to the point cloud encapsulation method and the point cloud decapsulation method provided in this embodiment of this disclosure.

The solution for point cloud transmission in the application scenario includes the following processes.

(1) The server encapsulates a point cloud bitstream into a point cloud file.

An encapsulation structure of the point cloud file is the same as that of the foregoing application scenario, which may not be described herein again.

(2) The server generates a corresponding signaling description file based on sharing and an alternative relationship between a geometry component track and an attribute component track, and transmits the signaling file to the client.

Based on the point cloud file encapsulated in the foregoing application scenario, the generated signaling file includes the following information.

Representation1 (Track1):
PCCAlternativeInfo@shared_alternative_track_flag=1;
PCCAlternativeInfo@ alternative_id=1;
PCCAlternativeInfo@share_alternative_group_id={2,3}.
Representation2 (Track2):
PCCAlternativeInfo@shared_alternative_track_flag=0;
PCCAlternativeInfo@ alternative_id=2;
Representation3 (Track3):
PCCAlternativeInfo@shared_alternative_track_flag=0;
PCCAlternativeInfo@ alternative_id=2;
Representation4 (Track4):
PCCAlternativeInfo@shared_alternative_track_flag=1;
PCCAlternativeInfo@ alternative_id=3;
PCCAlternativeInfo@share_alternative_group_id={2}.
Representation5 (Track5):
PCCAlternativeInfo@shared_alternative_track_flag=0;
PCCAlternativeInfo@ alternative_id=1;

(3) After receiving and parsing the signaling file, the client requests a corresponding transmission stream (one or more tracks in a corresponding file) Fs based on a requirement of the client. The client decapsulates and decodes a received file segment and finally presents point cloud content.

According to signaling information, the client has three options:

$$Representation1 + Representation2 + Representation4;$$

$$Representation1 + Representation3 + Representation4; \text{ and}$$

$$Representation5.$$

Each operation in the method of this disclosure is described in a specific order in the accompanying drawings, however, this does not request or imply that the operations are performed according to the specific order, or all shown operations are necessarily performed so as to implement a desired result. Additionally or alternatively, some operations may be omitted, a plurality of operations may be combined into one operation for execution, and/or one operation may be decomposed into a plurality of operations for execution, and the like.

The following describes apparatus embodiments of this disclosure, and the apparatus embodiments may be configured for performing the method in the foregoing embodiment of this disclosure.

Figure 16:
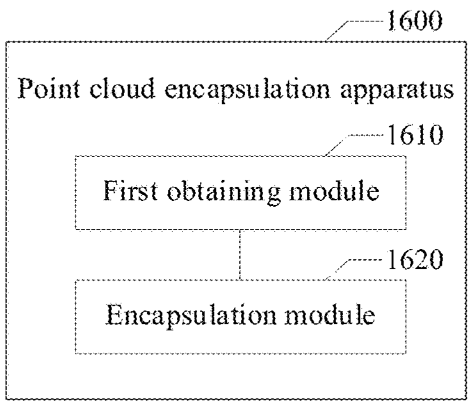
FIG. 16 is a schematic block diagram of a structure of a point cloud encapsulation apparatus according to an embodiment of this disclosure.

FIG. 16 is a schematic block diagram of a structure of a point cloud encapsulation apparatus according to an embodiment of this disclosure. As shown in FIG. 16, the point cloud encapsulation apparatus 1600 includes:

a first obtaining module 1610, configured to obtain an information data box for a content entity carrying point cloud data, the information data box including an entity identification field, and the entity identification field being configured for indicating whether the content entity independently belongs to one point cloud bitstream or is shared by at least two point cloud bitstreams alternative to each other; and an encapsulation module 1620, configured to encapsulate the content entity into a point cloud file based on the information data box.

In conclusion, the apparatus 1600 may add the information data box to the content entity to indicate whether the content entity is reused by the point cloud bitstream, so that only one copy of the reused content entity can be retained, thereby reducing bitstream and improving data transmission efficiency. In addition, indicating whether the content entity is reused by the point cloud bitstream is beneficial to clearly define an alternative relationship between different point cloud bitstreams, so that a plurality of alternative point cloud bitstreams can be generated based on the alternative relationship. The alternative relationship here between the plurality of point cloud bitstreams is a relationship in which any two of the plurality of point cloud bitstreams serve as backups for each other. In other words, the plurality of alternative point cloud bitstreams are different bitstream options with various quality generated for the same source point cloud data.

Figure 17:
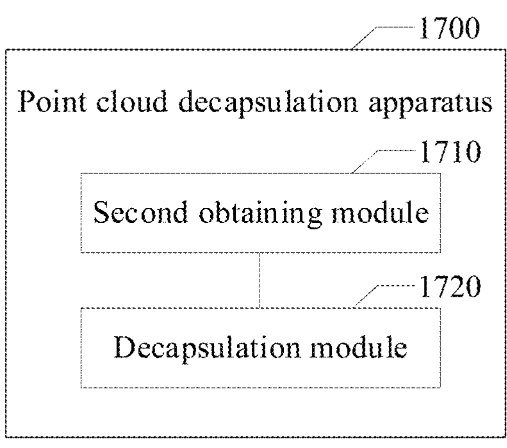
FIG. 17 is a schematic block diagram of a structure of a point cloud decapsulation apparatus according to an embodiment of this disclosure.

FIG. 17 is a schematic block diagram of a structure of a point cloud decapsulation apparatus according to an embodiment of this disclosure. As shown in FIG. 17, the point cloud decapsulation apparatus 1700 includes:

a second obtaining module 1710, configured to obtain an information data box of a content entity carrying point cloud data in a point cloud file, the information data box including an entity identification field, and the entity identification field being configured for indicating whether the content entity independently belongs to one point cloud bitstream or is shared by at least two point cloud bitstreams alternative to each other; and a decapsulation module 1720, configured to decapsulate the point cloud file based on the information data box to obtain at least one point cloud bitstream including the content entity.

Specific details of the point cloud encapsulation apparatus and the point cloud decapsulation apparatus provided in each embodiment of this disclosure are described in detail in the corresponding method embodiments and are not be described herein again.

Figure 18:
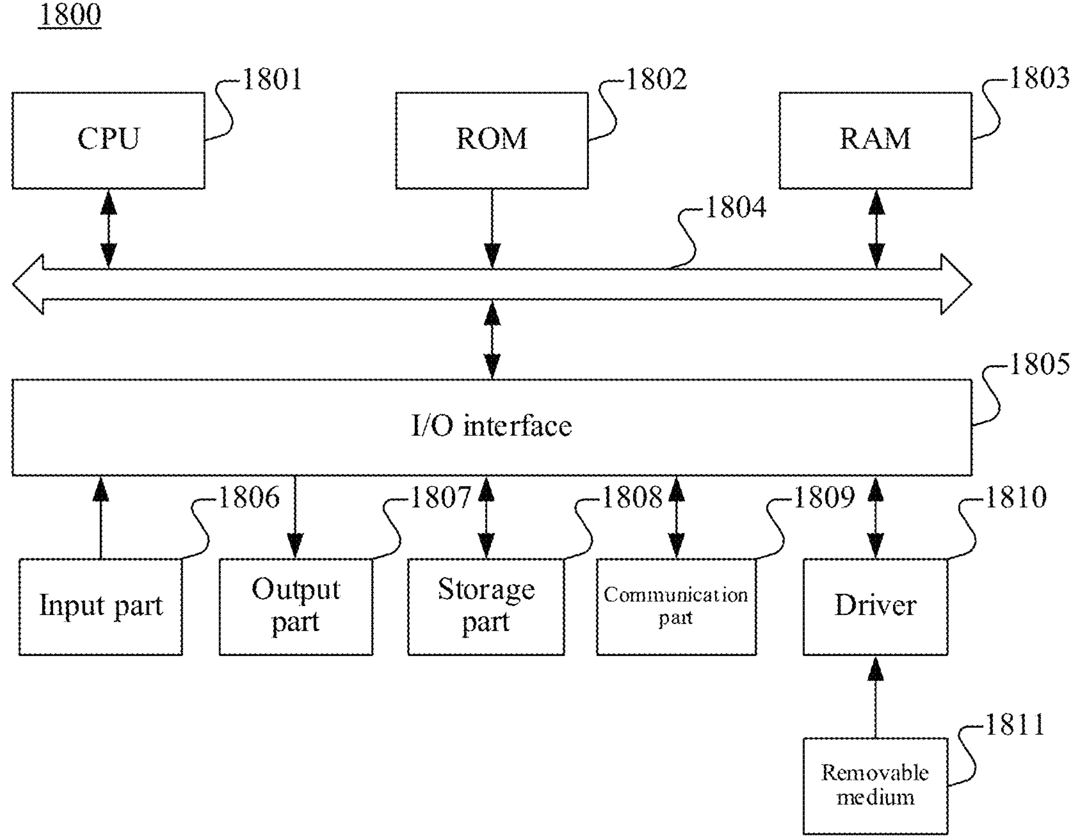
FIG. 18 is a schematic block diagram of a structure of a computer system of an electronic device configured to implement an embodiment of this disclosure.

FIG. 18 is a schematic block diagram of a structure of a computer system of an electronic device for implementing an embodiment of this disclosure.

The computer system 1800 of the electronic device shown in FIG. 18 is merely an example, and does not constitute any limitation on functions and use ranges of this embodiment of this disclosure.

As shown in FIG. 18, the computer system 1800 includes a central processing unit (CPU) 1801, which may execute various proper actions and processing based on a program stored in a read-only memory (ROM) 1802 or a program loaded from a storage part 1808 into a random access memory (RAM) 1803. The random access memory 1803 further stores various programs and data required by system operations. The central processing unit 1801, the read-only memory 1802, and the random access memory 1803 are connected to each other via a bus 1804. An input/output interface (that is, an I/O interface) 1805 is also connected to the bus 1804.

The following members are connected to the input/output interface 1805: an input part 1806 including a keyboard and a mouth; an output part 1807 including, for example, a cathode ray tube (CRT), a liquid crystal display (LCD), and a speaker; a storage part 1808 including a hard disk and the like; and a communication part 1809 including a network interface card such as a local area network card or a modem. The communication part 1809 performs communication processing by using a network such as the Internet. A driver 1810 is also connected to the input/output interface 1805 as needed. A removable medium 1811, such as a magnetic disk, an optical disc, a photomagnetic disk, or a semiconductor memory, is installed on the driver 1810 as needed, so that a computer program read from the removable medium is installed into the storage part 1808 as needed.

Particularly, according to embodiments of this disclosure, the processes described in each method flowchart may be implemented as a computer software program. For example, an embodiment of this disclosure includes a computer program product, the computer program product includes a computer program carried on a computer-readable medium, and the computer program includes program code configured for performing the methods shown in the flowcharts. In such an embodiment, the computer program may be downloaded and installed from a network by using a communication part 1809, and/or installed from a removable medium 1811. When the computer program is executed by the central processing unit 1801, various functions defined in the system of this disclosure are performed.

The computer-readable medium shown in this embodiment of this disclosure may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection with one or more wires, a portable computer disk, a hard disk, a random access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof. In this disclosure, the computer-readable storage medium may be any tangible medium including or storing a program, and the program may be used by or used in combination with an instruction execution system, an apparatus, or a device. Moreover, in this disclosure, the computer-readable signal medium may include a data signal propagated in a baseband or as part of a carrier, and computer-readable program code is carried thereon. A data signal propagated in such a way may use a plurality of forms, including, but not limited to, an electromagnetic signal, an optical signal, or any appropriate combination thereof. The computer-readable signal medium may also be any computer-readable medium in addition to a computer-readable storage medium. The computer-readable medium may send, propagate, or transmit a program that is used by or used in combination with an instruction execution system, an apparatus, or a device. The program code included on the computer-readable medium may be transmitted by any appropriate medium, including, but not limited to: a wireless medium, a wired medium, and the like, or any appropriate combination thereof.

The flowcharts and block diagrams in the accompanying drawings illustrate possible system architectures, functions, and operations that may be implemented by a system, a method, and a computer program product according to various embodiments of this disclosure. In this regard, each box in a flowchart or a block diagram may represent a module, a program segment, or a part of code. The module, the program segment, or the part of code includes one or more executable instructions configured for implementing specified logic functions. In some alternative implementations, the functions labeled in the box may alternatively occur in a sequence different from those labeled in the accompanying drawings. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Although a plurality of modules or units of a device configured to perform actions are mentioned in the foregoing detailed description, such division is not mandatory. Actually, according to the implementations of this disclosure, the features and functions of two or more modules or units described above may be implemented in one module or unit. On the contrary, the features and functions of one module or unit described above may be further divided to be embodied by a plurality of modules or units.

According to the foregoing descriptions of the implementations, the implementations in some examples described herein may be implemented by using software, or may be implemented by combining software and necessary hardware. Therefore, the technical solutions of embodiments of this disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to embodiments of this disclosure.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

This disclosure is intended to cover any variations, uses, or adaptive changes of this disclosure. These variations, uses, or adaptive changes follow the general principles of this disclosure and include common general knowledge or common technical means in the art, which are not disclosed in this disclosure.

This disclosure is not limited to the precise structures described above and shown in the accompanying drawings, and various modifications and changes can be made without departing from the scope of this disclosure.

What is claimed is:

1. A method of point cloud decapsulation, comprising:

obtaining a first information data box of a first content entity that carries point cloud data of a point cloud in a point cloud file, the first information data box comprising a first entity identifying field, and the first entity identifying field being configured to indicate an alternative attribute of the first content entity associated with at least two point cloud bitstreams of the point cloud, the at least two point cloud bitstreams being alternative to each other, a first value of the first entity identifying field indicating that the first content entity belongs to a single point cloud bitstream of the at least two point cloud bitstreams a second value of the first entity identifying field indicating that the first content entity is a common portion shared by the at least two point cloud bitstreams; and decapsulating the point cloud file based on the first information data box to obtain at least one point cloud bitstream comprising the first content entity.

2. The method according to claim 1, wherein when the first entity identifying field indicates that the first content entity belongs to the single point cloud bitstream of the at least two point cloud bitstreams, the first information data box further comprises an alternative identification field, the alternative identification field is configured to indicate an identifier of an alternative group that comprises at least the first content entity, different content entities in the alternative group respectively belong to different point cloud bitstreams of the at least two point cloud bitstreams.

3. The method according to claim 1, wherein when the first entity identifying field indicates that the first content entity is shared by the at least two point cloud bitstreams, the first information data box further comprises a first set identification field, and the first set identification field is configured to indicate an identifier of an alternative group with second content entities that are respectively combined with the first content entity in different point cloud bitstreams of the at least two point cloud bitstreams.

4. The method according to claim 3, wherein when the first entity identifying field indicates that the first content entity is shared by the at least two point cloud bitstreams, the first information data box further comprises a first set quantity field, and the first set quantity field is configured to indicate a quantity of alternative groups combined with the first content entity in the at least two point cloud bitstreams.

5. The method according to claim 1, wherein when the first content entity is a point cloud track, the point cloud track comprises a plurality of point cloud samples in a time sequence, and when the first content entity is a point cloud project, the point cloud project comprises a plurality of point cloud samples without a time sequence.

6. The method according to claim 1, wherein the decapsulating comprises:

decapsulating the first content entity with the first information data box from the point cloud file.

7. The method according to claim 6, wherein the first content entity comprises a sample entry and a plurality of point cloud samples, and the first information data box is comprised in the sample entry of the first content entity.

8. The method according to claim 3, wherein:

the point cloud file comprises at least one geometry component track that includes point cloud geometry data and at least one attribute component track that includes point cloud attribute data;

the first content entity is a geometry component track;

the first entity identifying field indicates that the geometry component track is shared by the at least two point cloud bitstreams; and the first set identification field indicates the identifier of the alternative group with attribute component tracks that are respectively combined with the geometry component track in the different point cloud bitstreams.

9. The method according to claim 3, wherein when a second entity identifying field in a second information data box of a second content entity in the point cloud file indicates that the second content entity belongs to a single point cloud bitstream, and a second identifier of a second alternative group comprising the second content entity is not in a third information data box of a third content entity in the point cloud file, the second content entity is a first point cloud bitstream in the at least two point cloud bitstreams, and the first point cloud bitstream is alternative to a second point cloud bitstream that includes another content entity in the second alternative group with the second content entity.

10. The method according to claim 3, wherein the point cloud file comprises a plurality of point cloud slice tracks using a point cloud slice as a point cloud sample; the first content entity is a first point cloud slice track, when the first point cloud slice track comprises point cloud geometry data, the first entity identifying field indicates that the first point cloud slice track is shared by the at least two point cloud bitstreams, and the first set identification field specifies the identifier of the alternative group, the first point cloud slice track and each second point cloud slice track in the alternative group are combined in a point cloud bitstream in the at least two point cloud bitstreams.

11. The method according to claim 1, further comprising:

obtaining a signaling file for describing the point cloud file, the signaling file comprising an entity identification element, and the entity identification element being configured to indicate whether the first content entity belongs to the single point cloud bitstream or is shared by the at least two point cloud bitstreams; and requesting, based on the signaling file, one or more content entities belonging to the at least one point cloud bitstream in the point cloud file for the at least one point cloud bitstream.

12. The method according to claim 11, wherein the signaling file further comprises an alternative identification element, and the alternative identification element is configured to indicate an identifier of an alternative group that comprises at least the first content entity.

13. The method according to claim 11, wherein when the entity identification element indicates that the first content entity is shared by the at least two point cloud bitstreams, the signaling file further comprises a set identification element, and the set identification element is configured to indicate an identifier of an alternative group with second content entities that are respectively combined with the first content entity in different point cloud bitstreams of the at least two point cloud bitstreams.

14. A method of point cloud encapsulation, comprising:

obtaining a first information data box of a first content entity that carries point cloud data of a point cloud, the first information data box comprising a first entity identifying field, and the first entity identifying field being configured to indicate an alternative attribute of the first content entity associated with at least two point cloud bitstreams of the point cloud, the at least two point cloud bitstreams being alternative to each other, a first value of the first entity identifying field indicating that the first content entity belongs to a single point cloud bitstream in the at least two point cloud bitstreams, a second value of the first entity identifying field indicating that the first content entity is a common portion shared by the at least two point cloud bitstreams; and encapsulating the first content entity into a point cloud file based on the first information data box.

15. The method according to claim 14, further comprising:

generating a signaling file for describing the point cloud file, the signaling file comprising an entity identification element, and the entity identification element being configured to indicate whether the first content entity belongs to the single point cloud bitstream or is shared by the at least two point cloud bitstreams.

16. An apparatus for point cloud decapsulation, comprising processing circuitry configured to:

obtain a first information data box of a first content entity that carries point cloud data of a point cloud in a point cloud file, the first information data box comprising a first entity identifying field, and the first entity identifying field being configured to indicate an alternative attribute of the first content entity associated with at least two point cloud bitstreams of the point cloud, the at least two point cloud bitstreams being alternative to each other, a first value of the first entity identifying field indicating that the first content entity belongs to a single point cloud bitstream of the at least two point cloud bitstreams a second value of the first entity identifying field indicating that the first content entity is a common portion shared by the at least two point cloud bitstreams; and decapsulate the point cloud file based on the first information data box to obtain at least one point cloud bitstream comprising the first content entity.

17. The apparatus according to claim 16, wherein when the first entity identifying field indicates that the first content entity belongs to the single point cloud bitstream of the at least two point cloud bitstreams, the first information data box further comprises an alternative identification field, the alternative identification field is configured to indicate an identifier of an alternative group that comprises at least the first content entity, different content entities in the alternative group respectively belong to different point cloud bitstreams of the at least two point cloud bitstreams.

18. The apparatus according to claim 16, wherein when the first entity identifying field indicates that the first content entity is shared by the at least two point cloud bitstreams, the first information data box further comprises a first set identification field, and the first set identification field is configured to indicate an identifier of an alternative group with second content entities that are respectively combined with the first content entity in different point cloud bitstreams of the at least two point cloud bitstreams.

19. The apparatus according to claim 18, wherein when the first entity identifying field indicates that the first content entity is shared by the at least two point cloud bitstreams, the first information data box further comprises a first set quantity field, and the first set quantity field is configured to indicate a quantity of alternative groups combined with the first content entity in the at least two point cloud bitstreams.

20. The apparatus according to claim 16, wherein the processing circuitry is configured to:

obtain a signaling file for describing the point cloud file, the signaling file comprising an entity identification element, and the entity identification element being configured to indicate whether the first content entity belongs to the single point cloud bitstream or is shared by the at least two point cloud bitstreams; and request, based on the signaling file, one or more content entities belonging to the at least one point cloud bitstream in the point cloud file for the at least one point cloud bitstream.

* * * * *